Feb. 23, 1960 R. W. STROUT 2,925,749
STRIP FEED PRESS WITH MAIN AND AUXILIARY FEED BAR MEANS
Filed Jan. 18, 1955 18 Sheets-Sheet 1
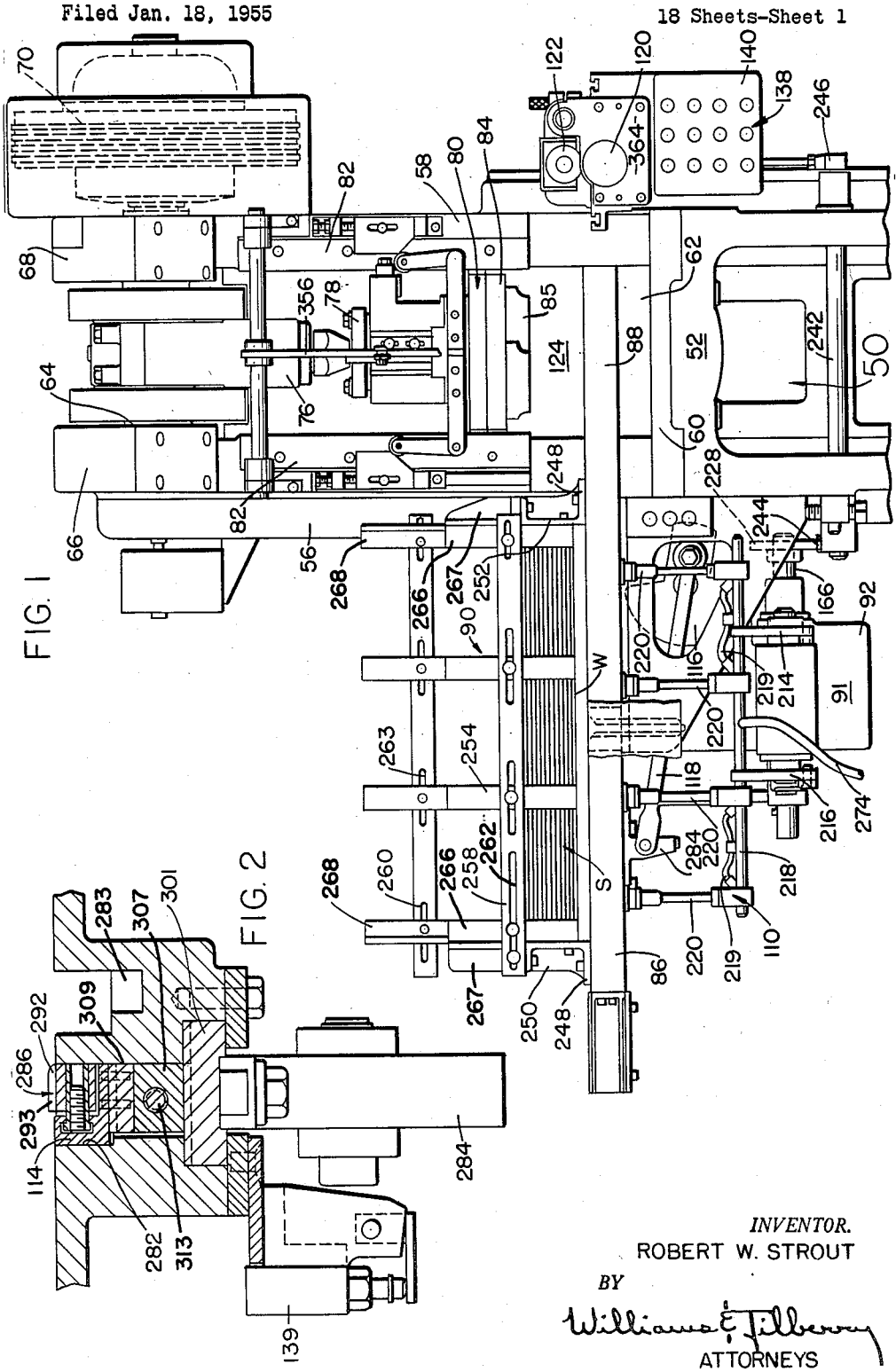
INVENTOR.
ROBERT W. STROUT
BY
Williams & Tilbery
ATTORNEYS Feb. 23, 1960  R. W. STROUT  2,925,749
STRIP FEED PRESS WITH MAIN AND AUXILIARY FEED BAR MEANS
Filed Jan. 18, 1955  18 Sheets-Sheet 2

INVENTOR.
ROBERT W. STROUT
BY
Williams & Tilberry
ATTORNEYS

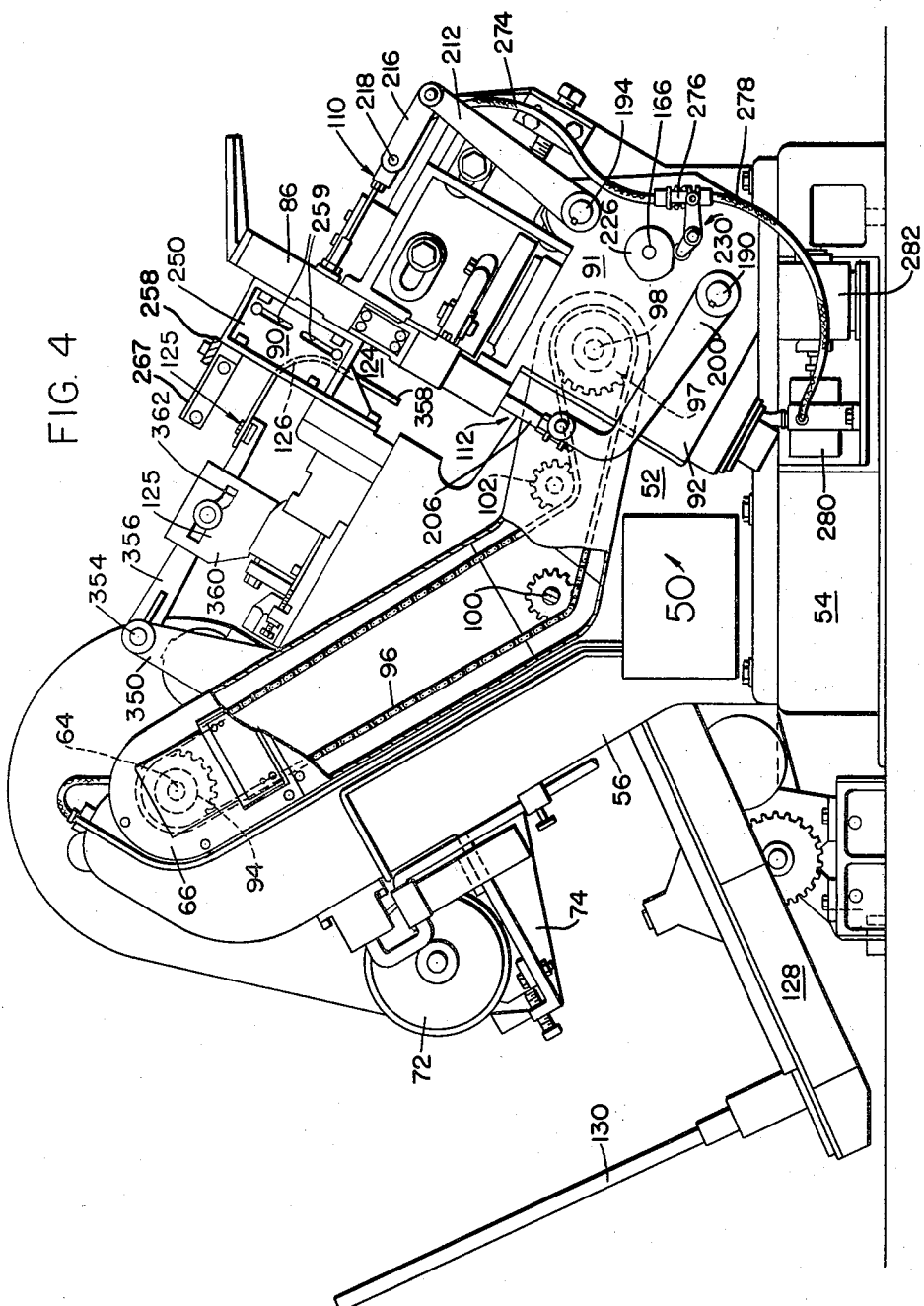

Feb. 23, 1960 R. W. STROUT 2,925,749
STRIP FEED PRESS WITH MAIN AND AUXILIARY FEED BAR MEANS
Filed Jan. 18, 1955 18 Sheets-Sheet 4
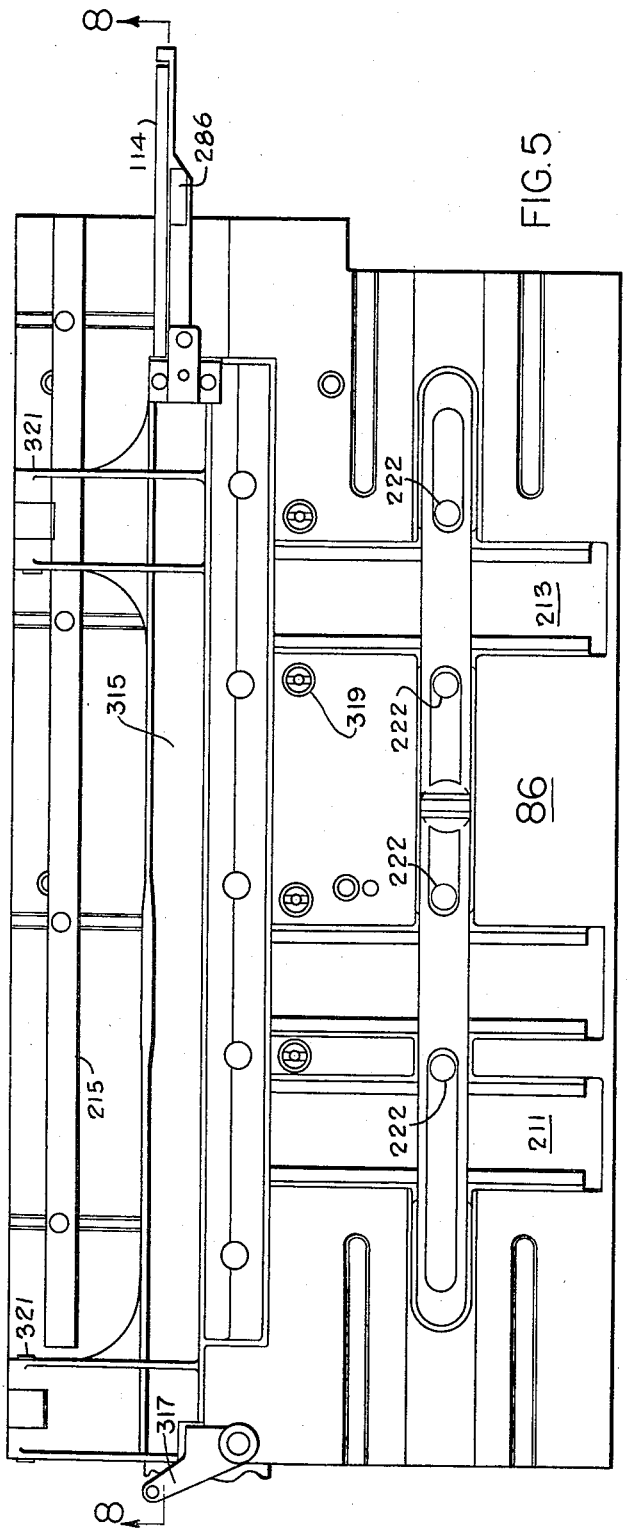
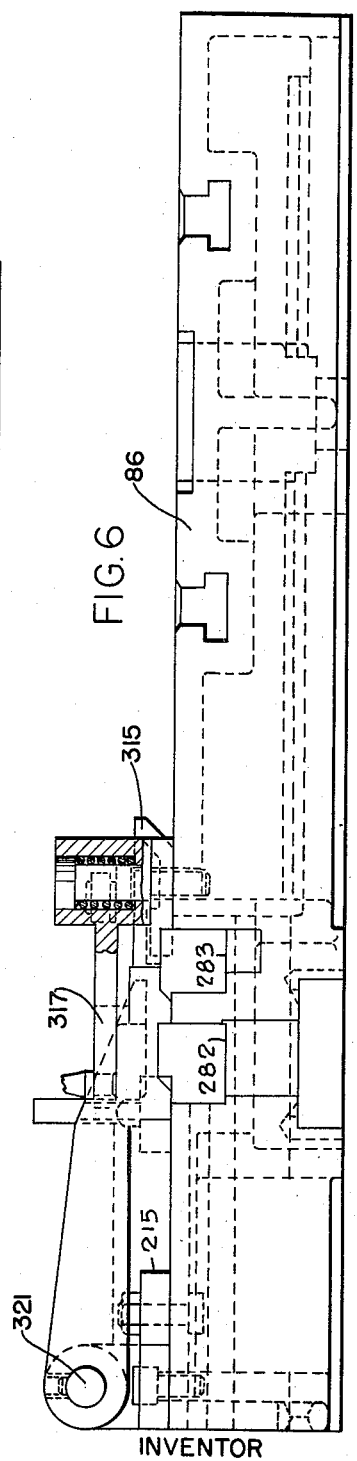
INVENTOR
ROBERT W. STROUT
BY Williams & Tilbury
ATTORNEYS

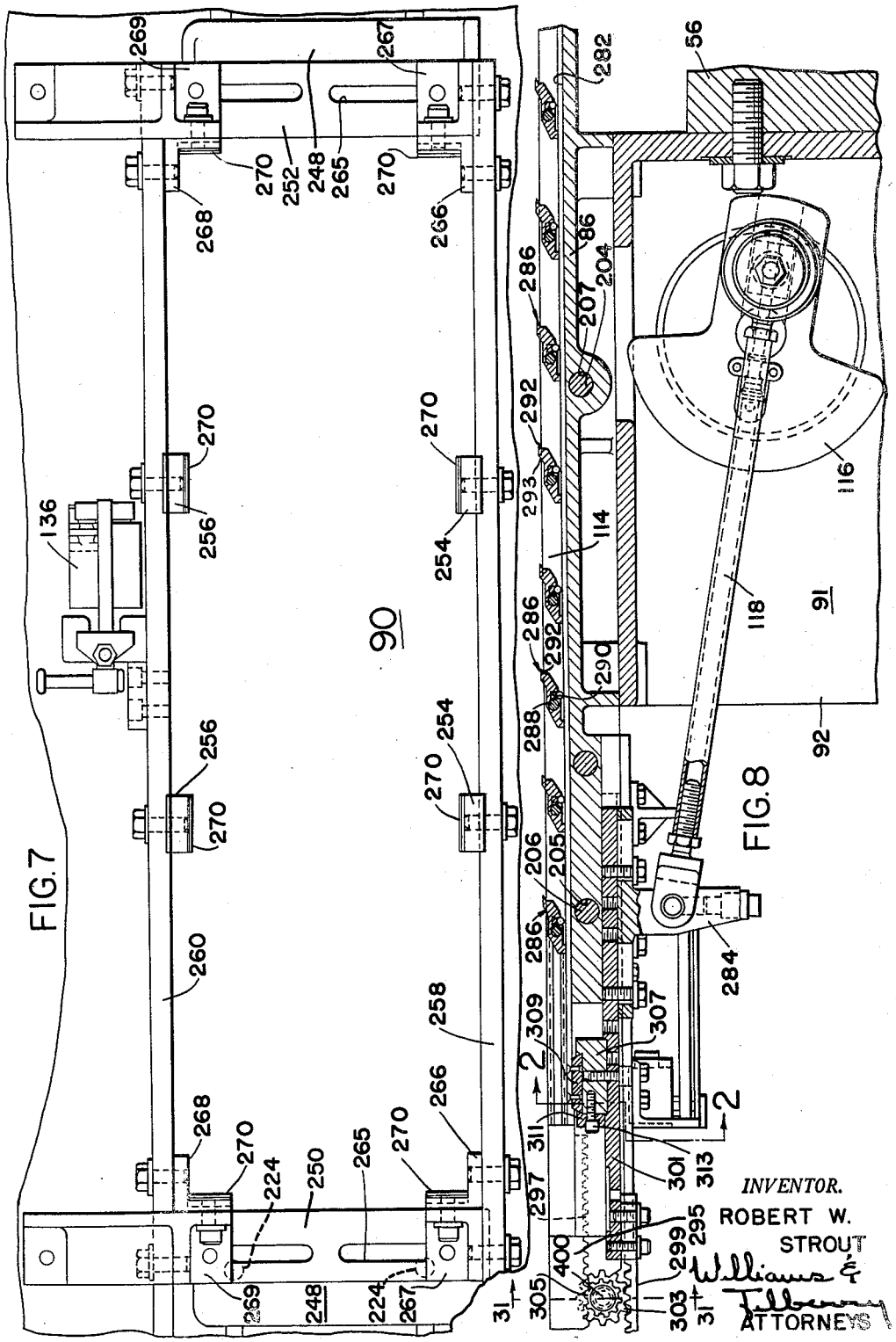

INVENTOR.
ROBERT W. STROUT
BY Williams & Tilberry
ATTORNEYS

Feb. 23, 1960  R. W. STROUT  2,925,749
STRIP FEED PRESS WITH MAIN AND AUXILIARY FEED BAR MEANS
Filed Jan. 18, 1955  18 Sheets-Sheet 7

INVENTOR.
ROBERT W. STROUT
BY
Williams & Tilberry
ATTORNEYS

INVENTOR.
ROBERT W. STROUT

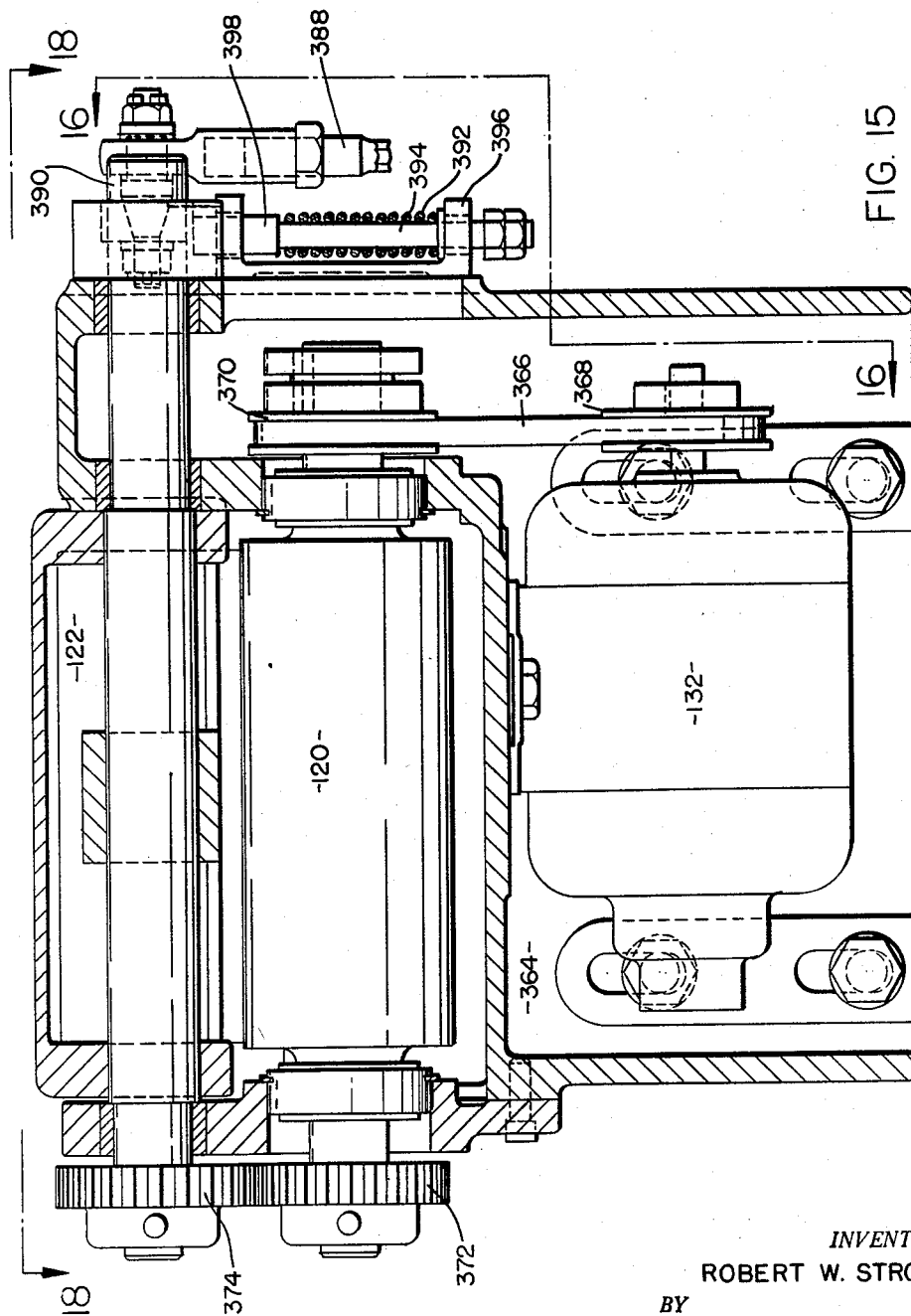

Feb. 23, 1960 R. W. STROUT 2,925,749
STRIP FEED PRESS WITH MAIN AND AUXILIARY FEED BAR MEANS
Filed Jan. 18, 1955 18 Sheets-Sheet 10

INVENTOR.
ROBERT W. STROUT
BY
Williams & Tilbury
ATTORNEYS

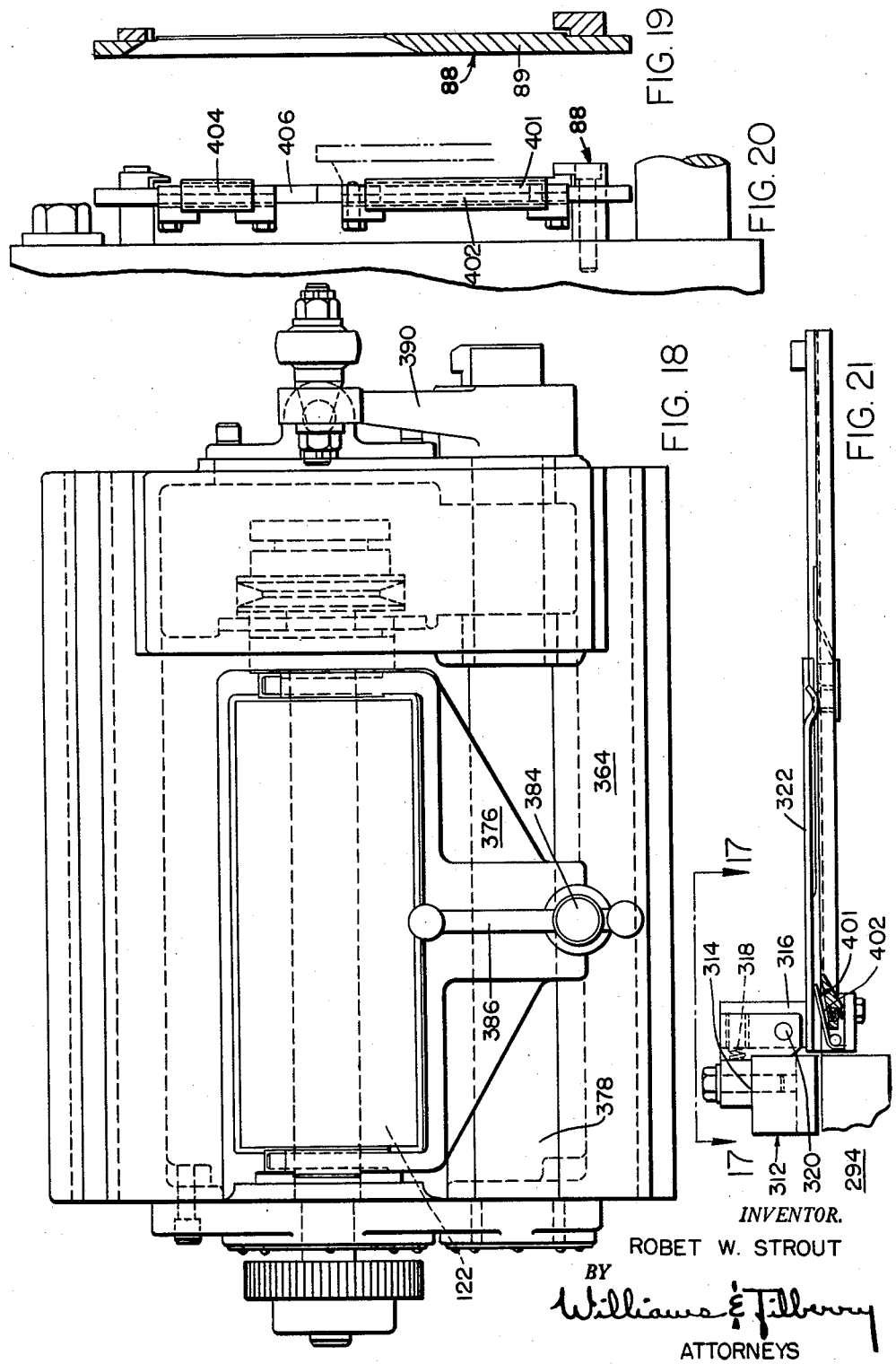

Feb. 23, 1960   R. W. STROUT   2,925,749
STRIP FEED PRESS WITH MAIN AND AUXILIARY FEED BAR MEANS
Filed Jan. 18, 1955   18 Sheets-Sheet 12
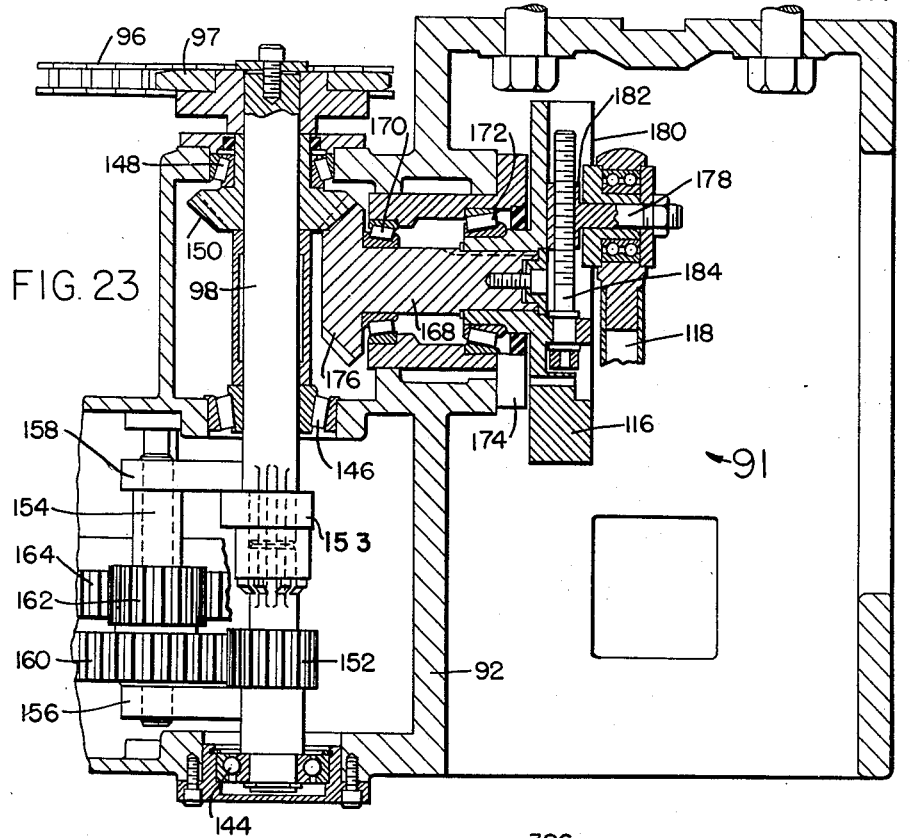
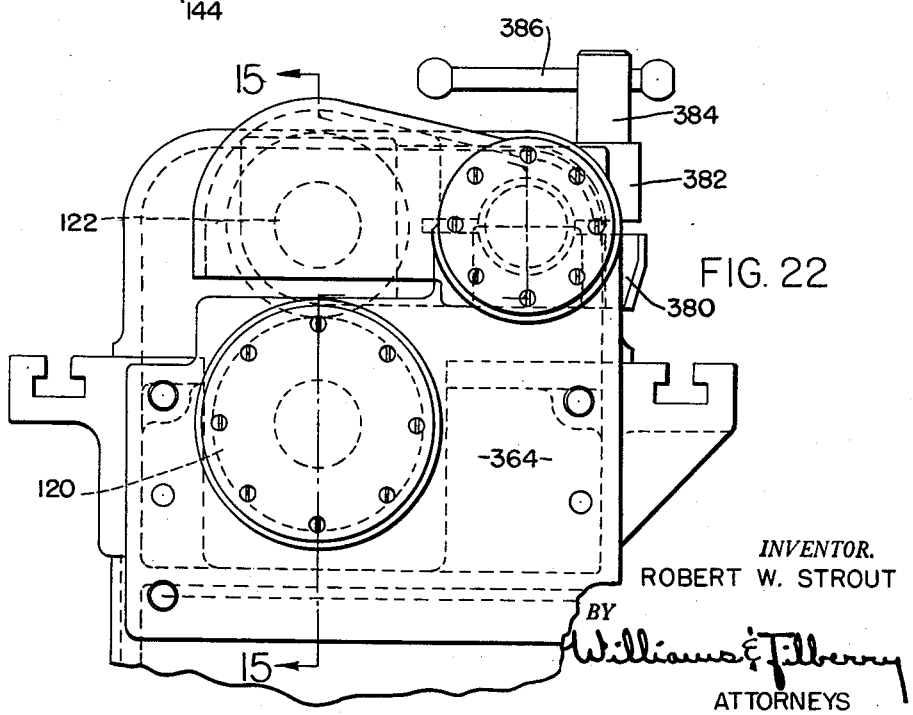
INVENTOR.
ROBERT W. STROUT
BY
Williams & Tilberry
ATTORNEYS INVENTOR.
ROBERT W. STROUT
BY Williams & Tilbury
ATTORNEYS Feb. 23, 1960     R. W. STROUT     2,925,749
STRIP FEED PRESS WITH MAIN AND AUXILIARY FEED BAR MEANS
Filed Jan. 18, 1955     18 Sheets-Sheet 14
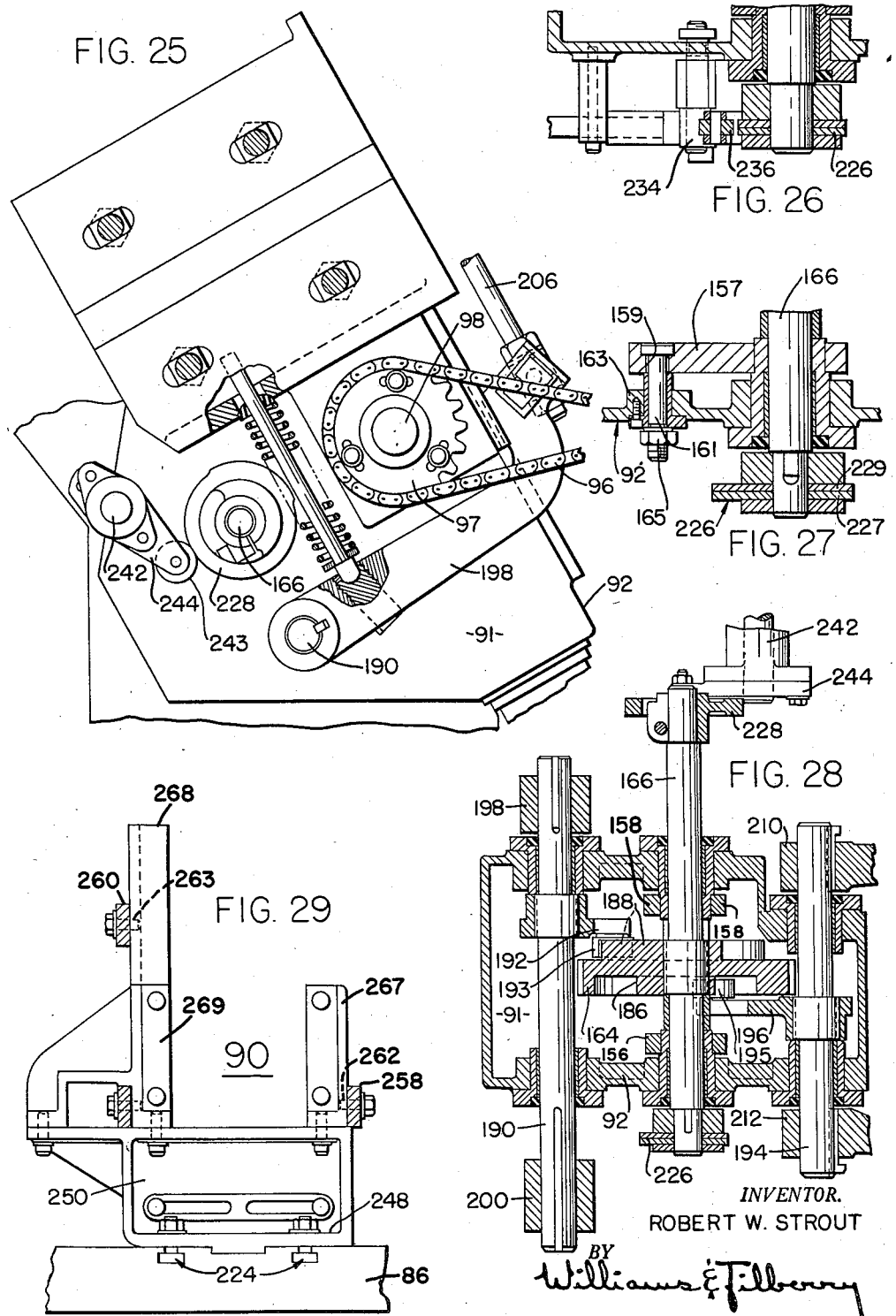
INVENTOR.
ROBERT W. STROUT
BY Williams & Filbury
ATTORNEYS

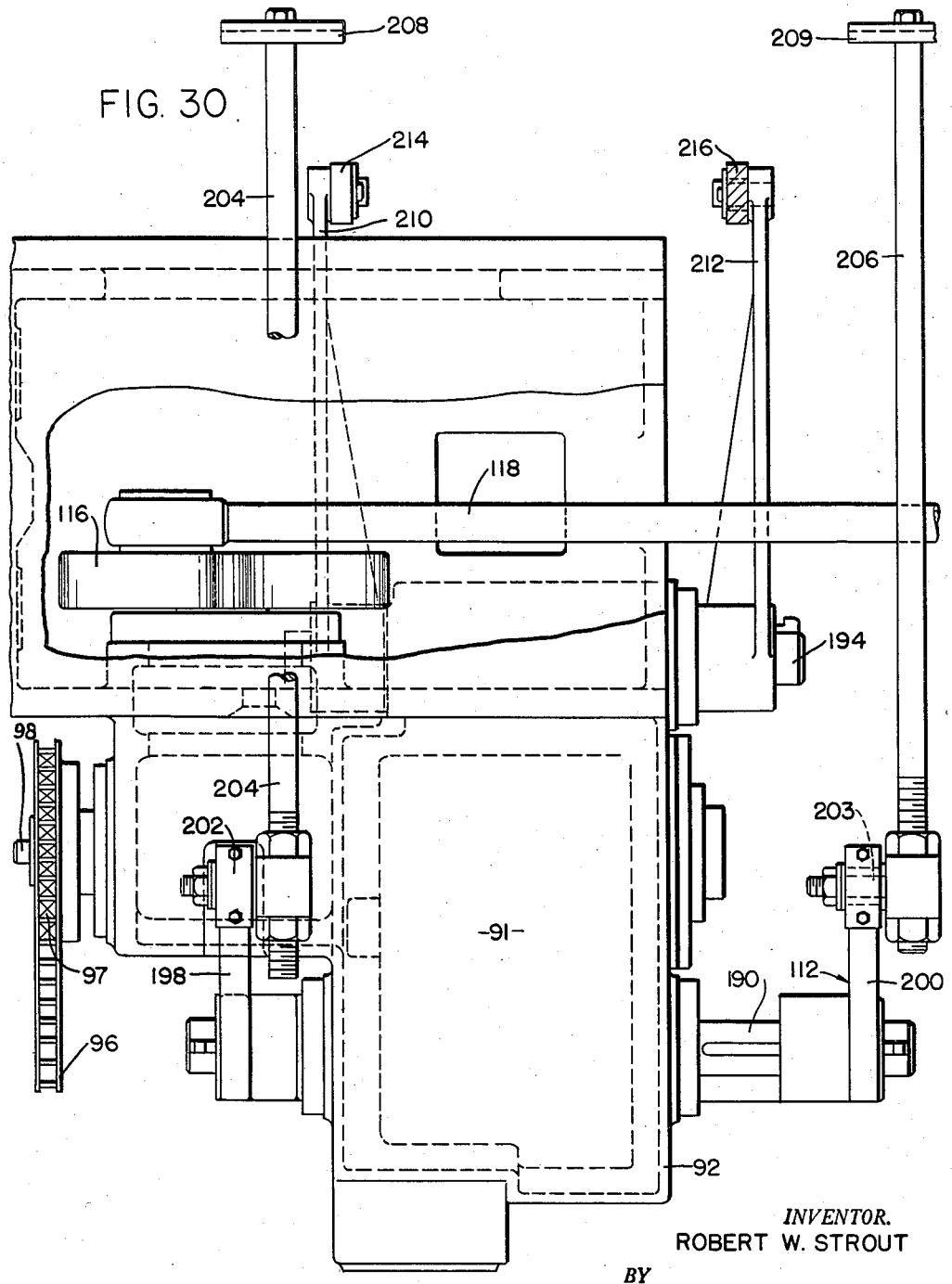

Feb. 23, 1960   R. W. STROUT   2,925,749
STRIP FEED PRESS WITH MAIN AND AUXILIARY FEED BAR MEANS
Filed Jan. 18, 1955   18 Sheets-Sheet 16
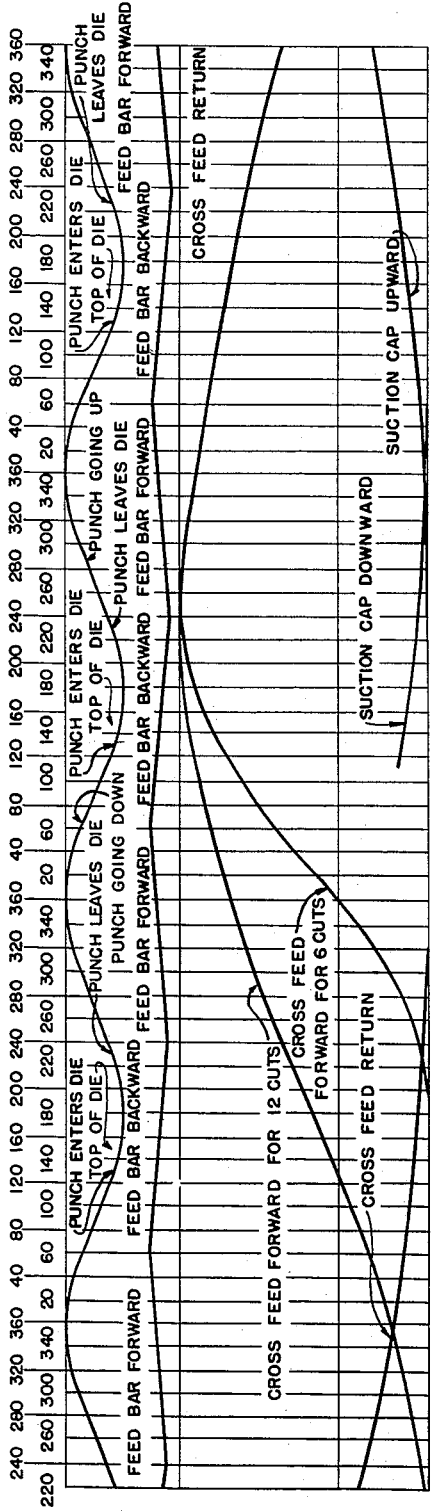
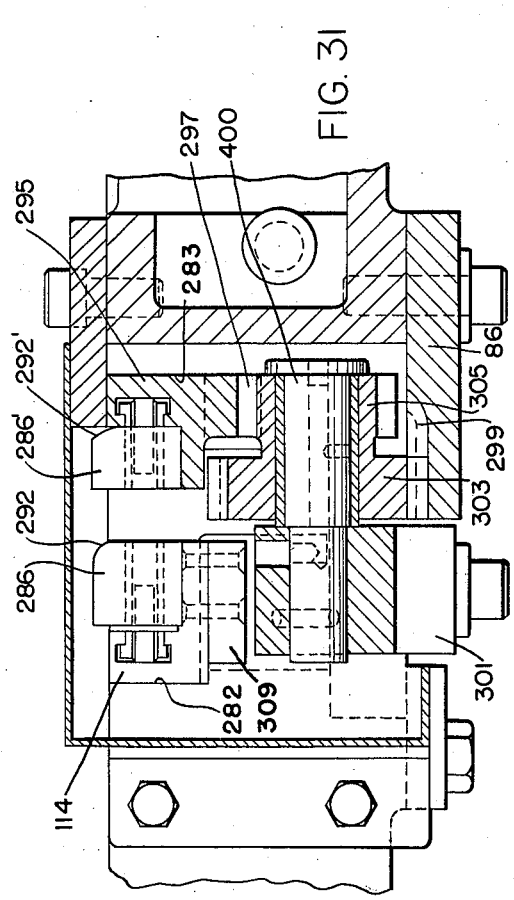
*INVENTOR.*
ROBERT W. STROUT
BY
*Williams & Tilbury*
ATTORNEYS

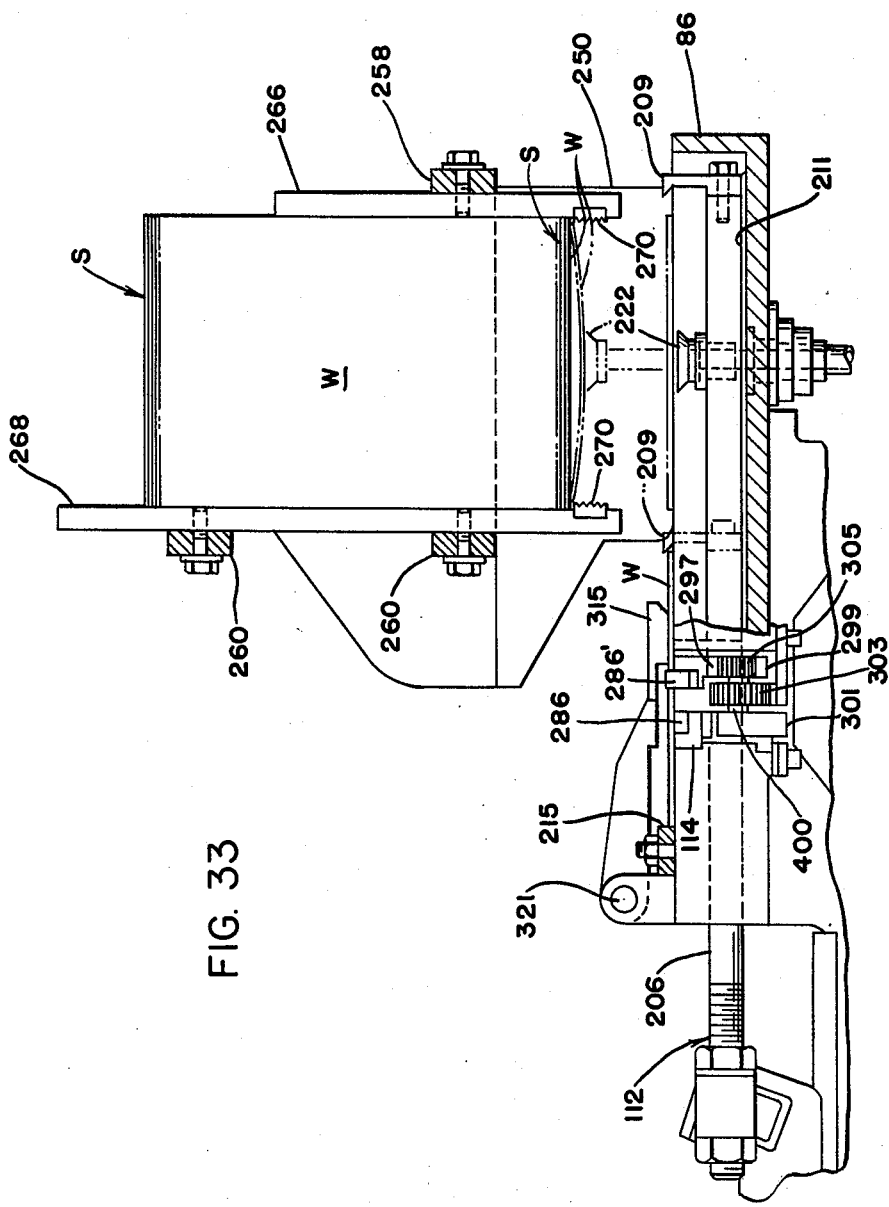

Feb. 23, 1960 R. W. STROUT 2,925,749
STRIP FEED PRESS WITH MAIN AND AUXILIARY FEED BAR MEANS
Filed Jan. 18, 1955 18 Sheets-Sheet 18

INVENTOR.
ROBERT W. STROUT
BY
Williams E. Tilbury
ATTORNEYS

United States Patent Office 2,925,749
Patented Feb. 23, 1960

2,925,749

STRIP FEED PRESS WITH MAIN AND AUXILIARY FEED BAR MEANS

Robert W. Strout, Brooklyn, N.Y., assignor to E. W. Bliss Company, Canton, Ohio, a corporation of Delaware Application January 18, 1955, Serial No. 482,497

4 Claims. (Cl. 83—423)

This invention relates in general to presses, and particularly to high-speed punch presses.

Specifically, this invention relates to punch presses of the strip feed variety wherein strips of thin sheet metal are fed continuously by automatic means between the punch and die, and whereinafter the workpieces and scrap pieces are automatically removed from the press.

At the present time, in the United States alone, 38 billion cans are used annually, and the trend toward new uses for cans is constantly increasing. In order to supply the tops and bottoms or can ends necessary in the manufacture of the standard cylindrical type can, manufacturers are faced with the problem of producing, at the minimum, 78 billion can ends a year, or more than one million ends an hour during a standard eight-hour work day. These staggering requirements for can ends and bodies have placed a tremendous strain on present equipment already in service, and has pointed up the need for faster, larger, stronger, and more efficient can making equipment.

It is an object, therefore, of this invention to provide a strip feed press which is adapted to manufacture can ends and the like in an improved manner and at a rate much faster than is possible with most presently available punch presses.

Other objects of the invention include: the provision of an improved inclined strip feed press which is fully automatic; the provision of a strip feed press having improved workstrip feed means, whereby the press may operate continuously without missing a stroke between workstrips; the provision of a strip feed press having novel positive workpiece and scrap ejecting means; the provision of electric safety means to stop the press in case of work jams, double strip feeds and other malfunctions; the provision of novel workstrip storage means above the feed table of the press which is quickly adjustable to accommodate workstrips of various sizes; the provision of novel means for depositing a single workstrip on the surface of the workfeed table and accurately locating it prior to being fed into the press; the provision of novel feed gear box assembly drive means adapted to synchronize the several mechanisms employed to accurately and quickly feed workstrips from the storage means above the workfeed table into the press; the provision of a novel strip feed gear box assembly adapted to provide from four to twenty four from a workstrip, requiring only minor adjustments to be made to the press within the four to twenty four cut range; and the provision of novel feed gear box assembly drive means adapted to synchronize all press elements operating cooperatively to move a workstrip automatically from a pre-positioned storage bin through the press and into a scrap receptacle after the workpieces have been removed from the workstrip.

The features of this invention which are believed to be novel are set forth with particularity in the appended claims. The invention itself, however, both as to its organization and use, together with further objects and advantages therefore, may best be understood by reference to the following description taken in connection with the accompanying drawings in which:

Figure 1 is a front elevation of a preferred embodiment of the strip feed press.

Figure 2 is a sectional view taken along the lines 2—2 of Figure 8 to show the assembly of parts employed with the workfeed bar.

Figure 4 is a full left side elevation of the press shown in Figure 1.

Figure 5 is a top plan view of the workfeed table.

Figure 6 is an end elevation of the workfeed table shown in Figure 5.

Figure 7 is a fragmentary plan view of the workfeed table showing the workstrip storage bin mounted thereon.

Figure 8 is a sectional view taken on the line 8—8 of Figure 5 showing more clearly the workfeed bar and eccentric drive means adapted to reciprocate the workfeed bar recessed in the surface of the workfeed table.

Figure 15 is a right side elevational view of the scrap ejector means employed with the preferred embodiment of the press, the view taken on line 15—15 of Fig. 22.

Figure 18 is a top plan view of the scrap ejector means shown in Figure 15.

Figure 19 is a sectional view, taken on the line 19—19 of Figure 10 showing a section through the double die cover plate, revolved 90° clockwise to utilize available space on the sheet.

Figure 20 is an elevational view taken on the line 20—20 of Figure 10, showing the plate lifting means adapted to overlap incoming and outgoing workstrip, revolved 90° clockwise to utilize available space on the sheet.

Figure 21 is an elevational view of the workstrip hold down means secured to one edge of the double strip detector means shown in Figure 17.

Figure 22 is a fragmentary front elevational view of the scrap ejector means shown in Figures 15, 16, and 18.

Figure 23 is a sectional view of the press feed gear box taken on the line 23—23 of Figure 24.

Figure 25 is a rear elevational view of the press feed gear box shown in Figure 24.

Figure 26 is a sectional view, taken on the line 26—26 of Figure 24, showing the vacuum pump cam actuating means.

Figure 27 is a sectional view, taken on the line 27—27 of Figure 24.

Figure 28 is a sectional view, taken on the line 28—28 of Figure 24, showing the feed gear box rockarm oscillating means.

Figure 29 is a left side elevational view of the workstrip crib mounted on the workfeed table.

Figure 30 is a rear elevational view of the feed gear box shown in Figure 24.

Figure 31 is a sectional view taken on the line 31—31 of Figure 8 to further show the assembly of parts employed with the workfeed bar.

Figure 32 is a time and motion diagram showing the movement of the various mechanisms of the strip feed press with relationship to each other.

Figure 33 is a fragmentary elevational view partly in section showing the co-action between the work piece, storage crib and work piece feeding means.

General arrangement

Figure 3:
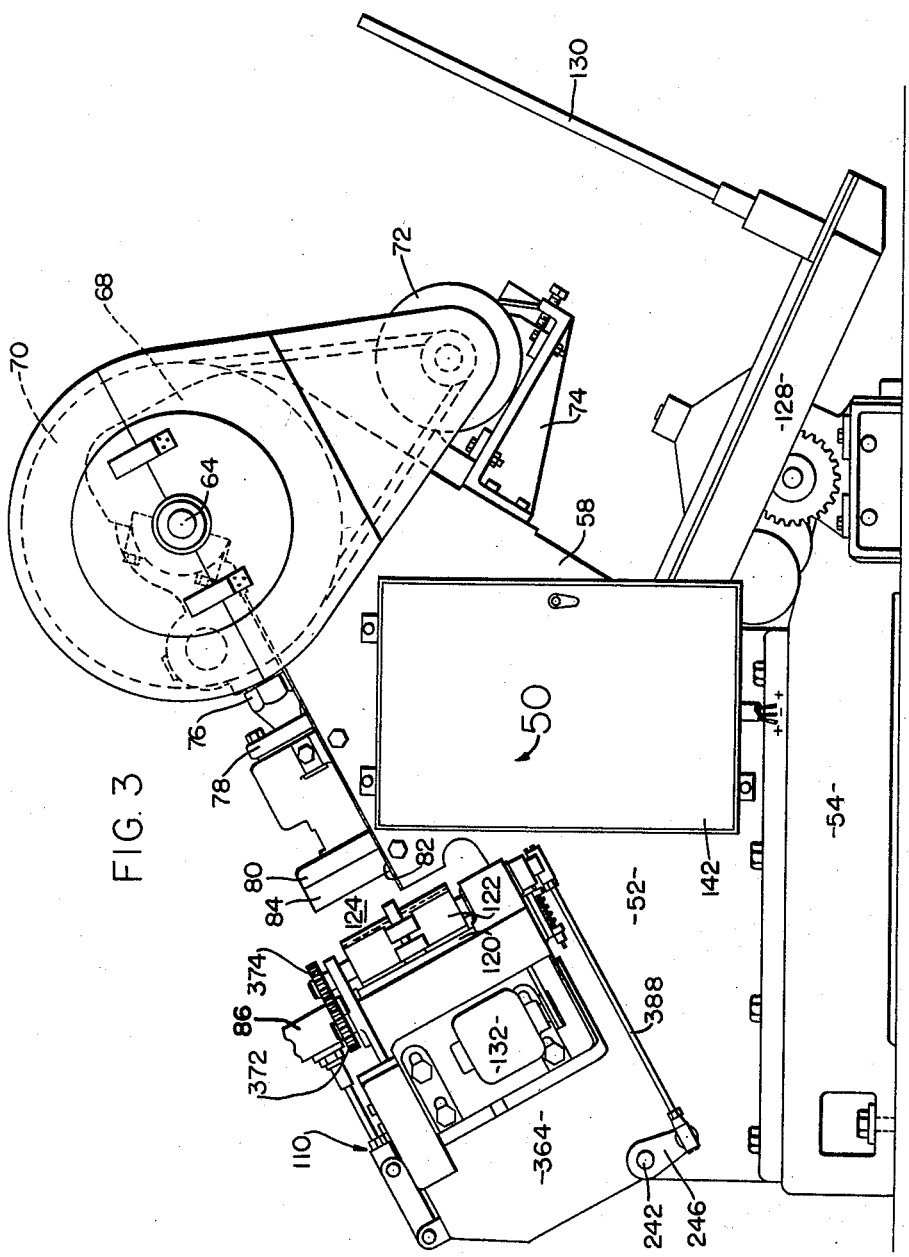
Figure 3 is a full right side elevation of the press shown in Figure 1.

Reference is now made to the drawing in greater detail and, in particular, to Figures 1, 3, and 4. The press 50 comprises, in general, a frame 52 having a base 54 and a pair of side members 56 and 58 inclined from front to rear and laterally spaced apart to secure a die bed 60 and bolster 62 therebetween (Figure 1), the die bed and bolster being inclined at an angle complementary to the angle of inclination of the side members. A single throw crankshaft 64 is journaled in the upper ends 66 and 68 of the side members 56 and 58. A combination flywheel and clutch and brake unit 70 is rotatably mounted on the right outboard end of the crankshaft 64 and is powered by a 5 horsepower motor 72, mounted on the back side of the frame by means of a motor mount bracket 74. A slide connection 76 is pivotally fastened to the crankpin of the crankshaft 64, the lower end of which is secured by ball and socket means 78 to the press slide 80, which is slidably secured between the side members 56 and 58 by means of bronze lined gibs 82. A filler plate 84 is fastened to the lower side of the slide 80, to which is secured a double punch 85.

A workfeed table 86 (see Figure 1) is bolted or otherwise adjustably secured to the left side member 56 at an inclination to the horizontal, and parallel to the press die bed 60. When the press is set up for operation, the top surface of the double die 88 is substantially parallel to and co-planar with the top surface of the workfeed table 86, so that workstrips W may be fed smoothly across the surface of the workfeed table from left to right onto the double die. The workfeed table 86 is vertically adjustable to accommodate various die heights.

Workstrips W are stacked and contained in a skeletonized workstrip crib 90 adapted to hold a supply or stack of workstrips spaced above the surface of the workfeed table. The workstrip crib 90 is adjustable, front to back and right to left, to accommodate workstrips of various size, as will be set forth more fully hereinafter.

A feed gear box assembly 91 including a housing or gear box 92 is secured to the left side member 56 of the frame of the press and extends outwardly therefrom beneath the workfeed table 86. A sprocket 94 (see Figure 4) is keyed to the left outboard end of the press crankshaft 64 and is connected with a link chain 96 to sprocket 97 secured to the main drive shaft 98 of the press feed gear box assembly 91 to synchronize the movement of the members of the feed gear box assembly with that of the main crankshaft 64. Intermediate sprockets 100 and 102 are employed to position and to adjust the tension in the chain drive 96. As will be set forth more fully hereinafter, the press feed gear box assembly comprises a pair of rockshafts 190 and 194, and a camshaft 166 (see Figures 24 and 28) suitably synchronized to actuate related linkage, whereby a single workstrip W (Figure 1) may be removed from the bottom of the stack of workstrips S stored in the workstrip crib 90 for further processing.

A workstrip is deposited, by suction cup means 110 (see Figures 24 and 33) on the surface of the workfeed table 86, whereinafter a cross feed mechanism 112 moves the workstrip downwardly across the table's inclined surface into position for interception by a workfeed bar 114. The workfeed bar 114 (see Figures 2, 8, 31, 32, 33, and 34) is reciprocated by a counter-balanced crank disc 116 and connecting rod 118 having its outer end secured to arm 284 on feed bar 114 to intermittently feed a workstrip laterally from left to right across the surface of the workfeed table 86 onto the surface of the die 88. Each time the workfeed bar 114 reverses direction to move from right to left, the workstrip comes to a halt and the crankshaft 64 is timed to bring the punch 85 into contact therewith to stamp out a workpiece. As the crankshaft 64 returns to top dead center position, the workfeed bar 114 reverses direction again moving from left to right to advance the workstrip one more position prior to another stamping operation between the punch and double die, 85 and 88 respectively (see Figure 33).

When the last workblank has been stamped from a workstrip, the camshaft 166 of the press feed gear box assembly 91 is adapted to close the scrap ejector rolls 120 and 122 (see Figure 1) which grip the workstrip scrap to propel it laterally from left to right clear of the die space area 124. Suitable scrap receiving means, not shown, may be disposed adjacent to the right side of the press to catch the scrap as it is ejected from the press.

Figures 12, 13:
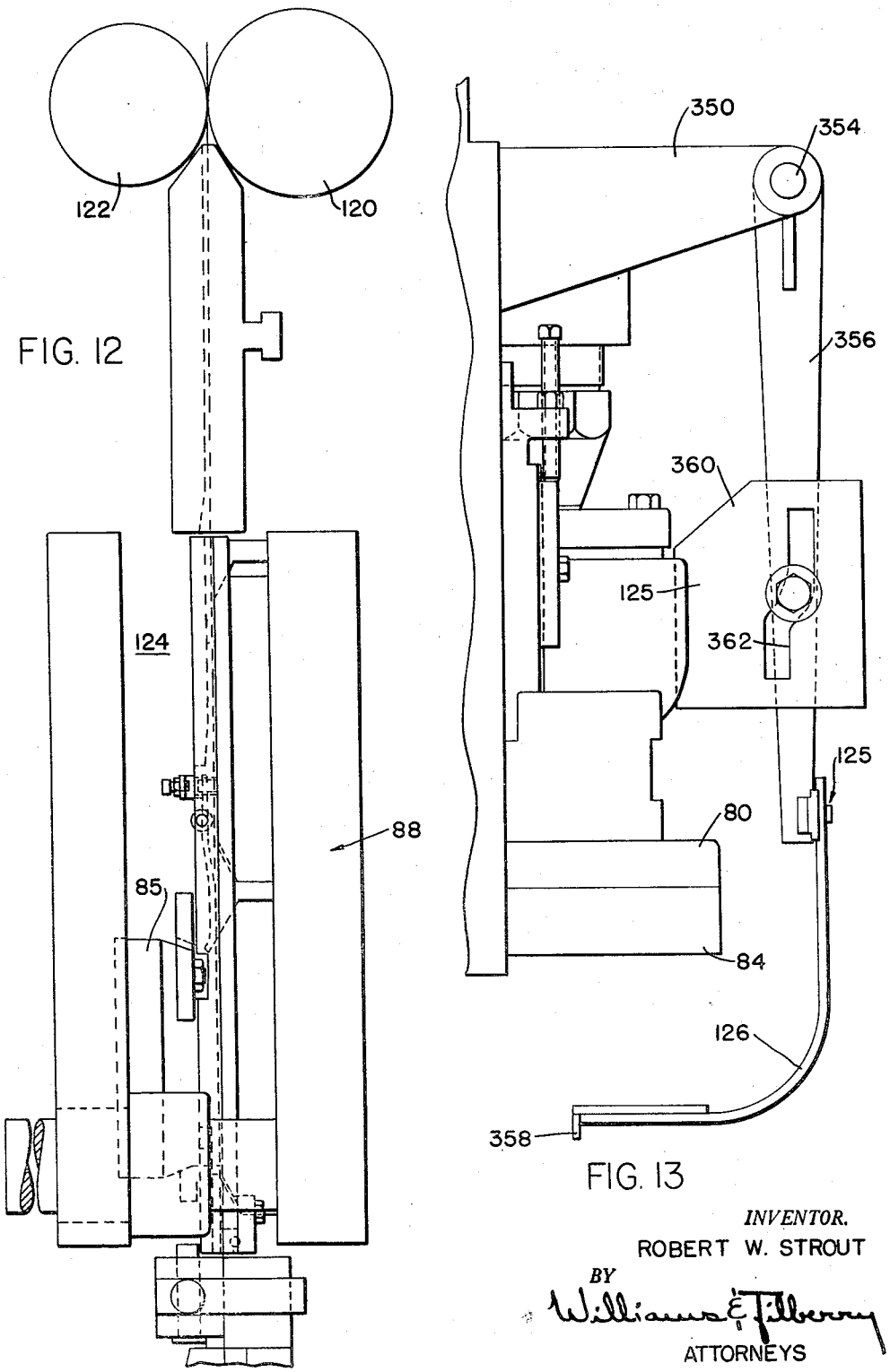
Figure 12 is a front elevational view of the press double die, bolster, and scrap ejector rolls, revolved 90° counter-clockwise to adapt the view to available space on the sheet.
Figure 13 is a fragmentary elevational view, taken on the line 13—13 of Figure 14, of the workpiece kickout means adapted to be operated by a cam plate secured to the front surface of the press slide.
Figure 14:
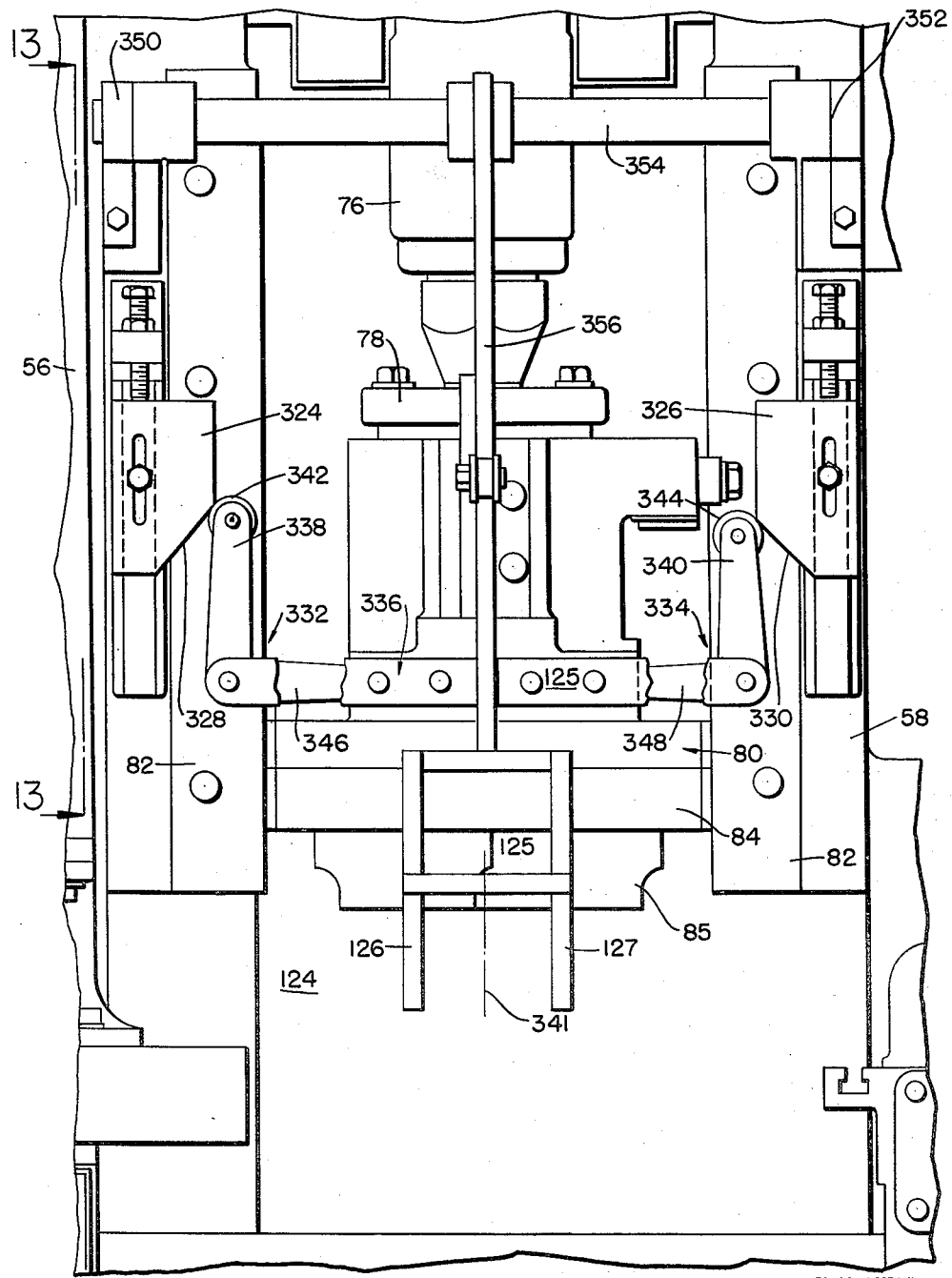
Figure 14 is an enlarged fragmentary elevational view of the upper portion of the press, showing in greater detail the cam operated workpiece knockout means.

Because of the high speed at which this press operates, the force of gravity alone is not sufficient to clear a workpiece from the die space area 124 quickly enough. Accordingly, special workpiece kickout apparatus 125 (see Figures 13 and 14) is secured to the frame members 56 and 58 and the slide 80 for synchronous operation with the up and down movement of the slide, as will be more fully explained as the description of the press progresses. The workpieces are forcibly ejected, as aforesaid, from the die space area 124 and are received on suitable belt driven conveyors (not shown). The conveyors rapidly carry the workpieces to the double curler means 128 (see Figures 3 and 4) positioned at the rear of the press to double curl the edges of the workpieces and automatically stack them in workpiece racks 130. Since the press stamps out two workpieces at a stroke, a pair of double curler means are provided in the present instance. The conveyors and double curlers are well understood by those skilled in the art and do not constitute a part of this invention. Further description, therefore, of those devices will not be undertaken hereinafter.

It will be noted that the principal source of power for the press is provided by the motor 72, but a separate motor 132 (see Figure 3) is used to operate the scrap ejector rolls 120 and 122; and a separately powered vacuum pump 280 (Figure 4) driven by motor 282 is mounted beneath the feed gear box assembly to provide a vacuum system in the workstrip positioning vacuum cup means 110. Micro switches are located throughout to stop the press in the event that a double or misfeed should occur at any transfer position of the press, i.e., from workstrip crib 90 to workfeed table 86 (see Figure 9), from workfeed table to double die 88 (see Figure 11), and thereafter between the die space and the double end curlers (not shown), should a misformed workpiece become jammed in the conveyors. As an additional safety feature, the upper end of connecting rod 118 is adapted to be released from engagement with arm 284 if an overload is encountered. When this event occurs, a micro switch 139 (see Figure 2) is adapted to be closed to stop the press.

The electrical button switch controls for the press are shown in Figure 1 at 138, where they are mounted on a control panel 140 within easy access of the press operator. The control box proper is shown at 142 in Figure 3, wherein are found the necessary wiring circuits to provide automatic control of the press.

*Feed gear box assembly*

The left, right, and rear elevations of the feed gear box assembly housing or gear box 92 are shown in Figures 23, 24, 25, and 30, respectively. The feed gear box assembly main driveshaft 98 (see Figure 23) is journaled in the housing 92 by means of frictionless bearings 144, 146, and 148, to rotatably carry a miter gear 150 near the end of the driveshaft adjacent bearings 148, and a spur gear pinion 152 adjacent bearings 144 near the opposite end of the main driveshaft. A change gear shaft 154 is journaled in a pair of adjusting levers 156 and 158 to carry rotatably thereon a gear 160 meshing with pinion 152, and a pinion 162 meshing with a camshaft main gear 164 rotatably carried on a camshaft 166 (see Figure 28). The levers 156 and 158 are pivotally secured to camshaft 166 and levers 156 and 158 are provided with depending portions 157 (see Figures 24 and 27) which contain arcuate slots 159. A bolt 161 acting as a fixed point is supported in a boss portion 163 of housing 92. The head of the bolt 161 is received in the slot 159 and may be brought into locked engagement with the slot by means of a nut 165 on the opposite or outboard end of the bolt. By loosening the nut 165 on the bolt 161, levers 156 and 158 are free to pivot about the axis of camshaft 166 carrying with them, at their free ends, the change gear shaft 154. Within the limits of movement provided by the arcuate slot 159, a change gear shaft 154 may, therefore, be adjusted with respect to the main driveshaft 98 to carry thereon gears of variable diameters depending upon the number of cuts desired from a given workstrip. When the proper adjustment has been made, and with a new gear 160 in place, the nut 165 is then tightened on the bolt 161 to secure the lever arms 156 and 158 in their newly adjusted positions. A cross shaft 168 is journaled with frictionless bearings 170 and 172 in a sleeve 174 to rotatably carry on one end the aforedescribed counterweighted crank disc 116, and, on its opposite end, a miter gear 176 meshing with the main drive shaft miter gear 150. A stud or pin 178 is slidably fastened in a slot 180 provided in the crank disc 116 to carry rotatably thereon the lower end of the workfeed bar connecting rod 118. The pin 178 is T-shaped and threaded through the T-head 182 of the pin to receive an adjusting screw 184. The adjusting screw 184 is adapted to radially vary the position of the pin 178 with respect to the axis of rotation of the crank disc 116, so as to vary the length of the stroke of the workfeed bar 114.

Referring now to Figure 28, the camshaft 166 is rotatably journaled in the housing 92 of the press feed gear box assembly transmission 91, as aforesaid, to rotatably carry thereon the main gear 164 having a cam groove 186 and a cam disc 188 on opposite faces of the gear. A rockshaft 190 is journaled in the housing 92 to oscillate therein, by virtue of being connected to cam 188 by means of a cam follower lever 192, one end of which is provided with a cam follower roller 193 to contact cam disc 188, and the other end of which is rigidly secured to the rockshaft. A second rockshaft 194 is journaled in the housing 92 to be oscillated therein by means of a cam follower lever 196 which is provided with a roller 195 in contact at one end with cam groove 186, and at the opposite end is rigidly secured to the rockshaft 194. Thus, as main gear 164 is rotatably driven by the gear train, set forth and described hereinabove, cam follower levers 192 and 196 are made to rock about the axes of their respective rockshafts 190 and 194, thereby imparting a similar rocking movement to the rockshafts.

A pair of drag links 198 and 200 (see Figures 24 and 30) are keyed to the opposite ends of rockshaft 190, and are connected with sliding bushings 202 and 203 to the lower ends of respective cross feed bars 204 and 206. The cross feed bars 204 and 206 are slidably journaled in the underside of the workfeed table 86 at 205 and 207 (see Figure 8), the upper ends of the cross feed bars having secured thereto workstrip claws or pull down brackets 208 and 209 which slide in channels 211 and 213 in the upper surface of table 86 (see Figure 5) and project upwardly normal to the surface of the workfeed table.

A second pair of drag links 210 and 212 are secured to the opposite ends of rockshaft 194, and are pivotally connected at their upper ends to the lower ends of a pair of links 214 and 216. The upper ends of the links are secured to a tubular cross rod 218 which carries a plurality of tubular vacuum rods 220 thereon. The vacuum rods 220 are secured in the workfeed table 86 to slidably move normal to the plane of the top surface of the table. The upper ends of the vacuum tubular rods 220 are provided with resilient vacuum cups 222. The vacuum tubular rods 220 are aligned on the longitudinal, or left to right center line of the workstrip crib 90.

The camshaft 166 is provided with a vacuum relief valve actuating cam 226 (see Figures 24 and 26) on the left outboard end of the camshaft, and the right outboard end of the camshaft is provided with an ejector roll actuating cam 228. A bellcrank type lever 230 is pivotally secured on frame pin 232, one arm 234 carrying a cam follower 236 to engage the cam surface of the cam 226, and the other arm 238 engaging a spring-loaded relief valve actuating ring 240. The cam 226 comprises a pair of like discs 227 and 229 (see Figure 27) which are counter-rotatable to adjust the length of the cam surface adapted to actuate the bellcrank 230 and ring 240 (see also Figure 24). A shaft 242 (see Figures 1 and 25) is journaled in the lower portions of side members 56 and 58, and carries on its left outboard end a cam follower 243 and lever 244 adapted to engage the cam surface of the cam 228, which time the opening and closing of the scrap ejector rolls 120 and 122. Contact of the cam follower 243 with the cam 228 rocks the shaft 242 about its own axis to oscillate a rock arm 246 (see Figure 3) keyed to the right outboard end of the rockshaft 242. An eccentric collar 153 (Figure 23) operates an oil pump (not shown) to force feed lubrication to all bearings.

*Work strip storage means*

As briefly referred to hereinabove, a skeletonized workstrip storage bin 90 (see Figures 7, 9, and 29) is bolted to the top surface of the workfeed table 86 by means of appropriate T-slot and bolt means 224 (Figure 29) in the workfeed table in locking engagement with the bases 248 of workstrip storage bin brackets 250 and 252. Because the workfeed table is inclined rearwardly, a plurality of vertical staves 254 and 256 are provided at the front and back of the bin, respectively, with the rear staves 256 being sufficiently long to compensate for the inclination of the workfeed table. The staves 256 provide for a good height of stacks of workstrips W (see Figure 1), and facilitate loading the crib from the front of the press. The staves are spaced apart and mounted in position by means of horizontal bars 258 and 260. Suitable slots, such as at 262 and 263 are provided in the horizontal bars to permit adjustability of the respective front and rear staves, and to enable the brackets 250 and 252 to be adjusted for lengthening or shortening the crib. Front to rear adjustment of the crib is also provided for by slots 265 in the tops of brackets 250 and 252 to which front corner posts 267 and rear corner posts 269 are bolted. The front and back horizontal bars are secured to the corner posts 267 and 269 (see Figure 7).

The lower ends of the four corner posts 266 and 268, as well as the lower ends of the front and back vertical staves 254 and 256, are provided with serrated or tooth portions 270 which face inwardly toward the center of the crib 90. These serrated portions are as long as the staves are wide, and project inwardly only enough to make minimum contact with the edges of the bottom workstrip of a stack of workstrips placed within the confines of the front, back, and side portions of the crib 90. These serrated portions 270 are spaced vertically above the surface of the workfeed table to provide clearance therebeneath for extracting the lower workstrip from the aforesaid stack of workstrips in the crib. To assist in the removal of workstrips from the crib 90, the serrated portions on staves 254 are resiliently mounted and yield to a predetermined downward pressure of the bottom workstrip W of stack S. Fastened on the rear staves 256 is a double thickness detector micro switch 136 which is spaced above the surface of the workfeed table an amount sufficient to permit one thickness of workstrip material to pass from front to back along the surface of the workfeed table without actuating the micro switch. However, should more than one workstrip be extracted from the bottom of the stack, then the extra thickness will contact the feeler 272 (see Figure 9) of the double thickness detector micro switch 136 to actuate the switch and stop the press.

Workfeed table

Figure 9:
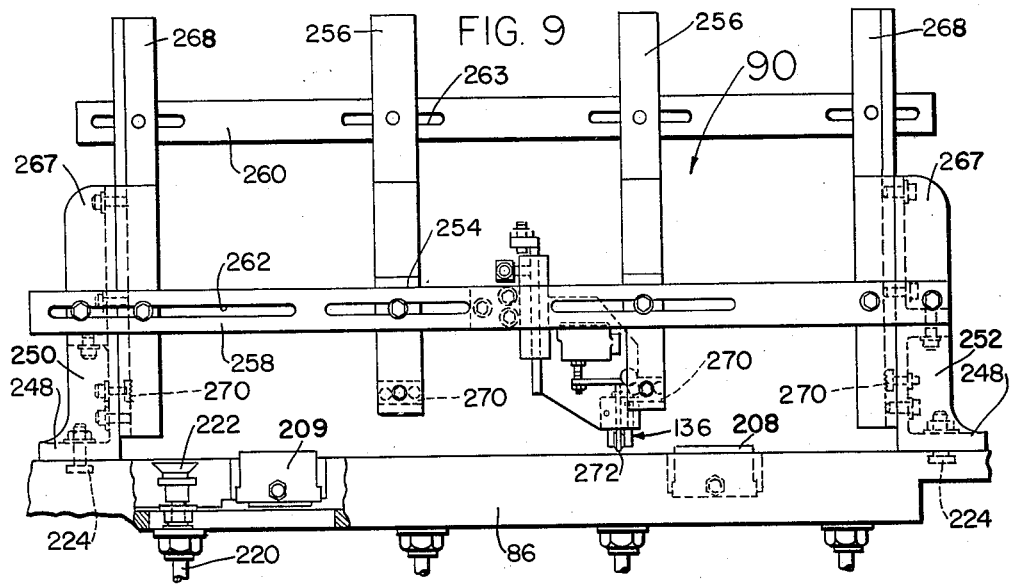
Figure 9 is a front elevational view of the workstrip storage bin shown in Figure 7 including a double feed detector micro switch mounted thereon to detect and stop the machine if more than one workstrip at a time is removed from the workstrip storage bin.
Figure 24:
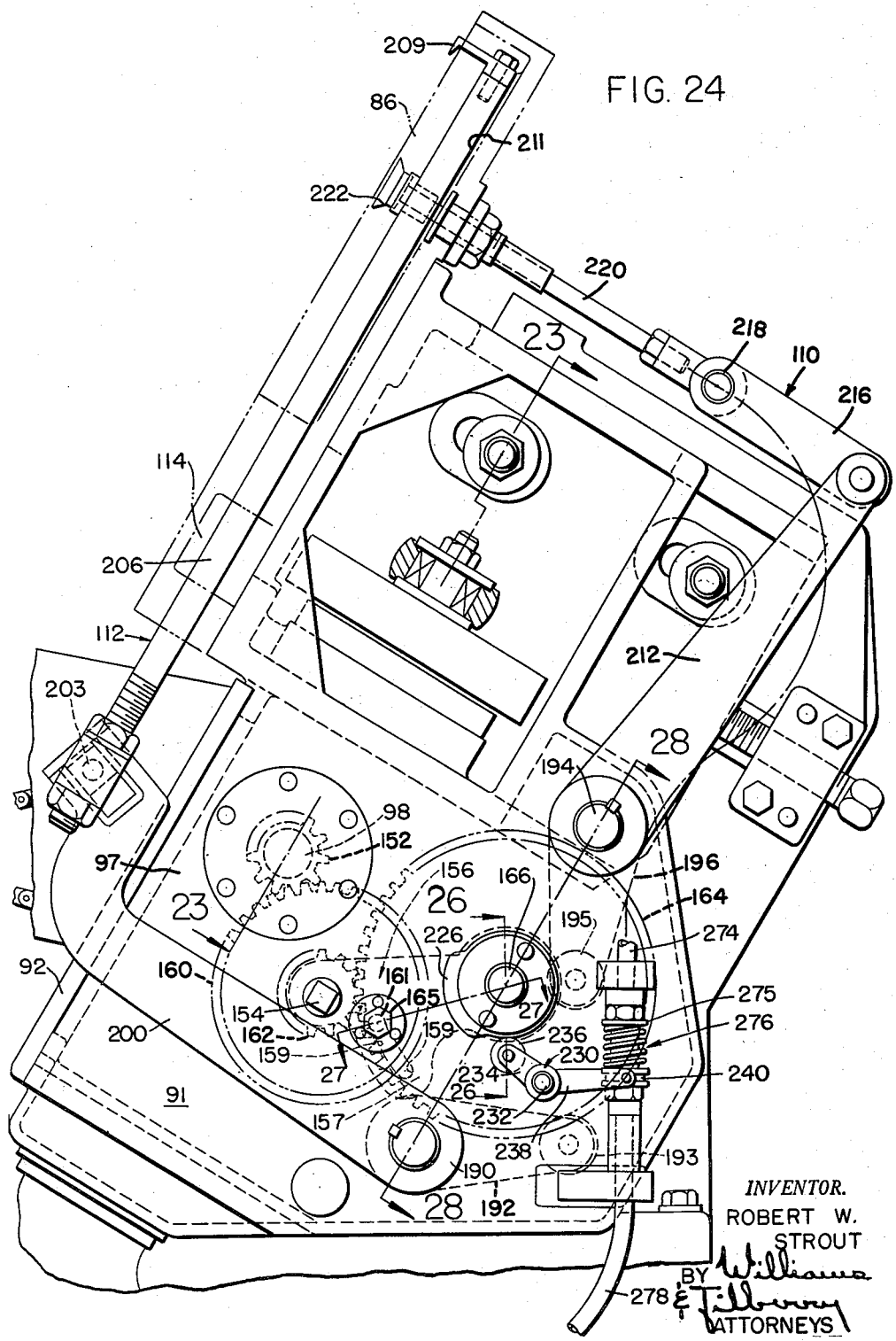
Figure 24 is a left elevational view of the press feed gear box showing also the workstrip positioning and cross feed mechanisms.

It will be observed in Figures 9 and 24 that the suction cups 222 secured to the upper ends of the tubular vacuum rods 220, in their lowermost position, are spaced slightly below the top surface of the workfeed table 86. The lower ends of the tubular vacuum rods 220 are connected to a tubular cross rod 218, having sealed ends and a hollow interior which is in communication with the interiors of the vacuum rods through flexible hose connections 219. The tubular cross rod 218 (see Figure 1) is secured to the upper ends of the links 214 and 216, and the links are pivotally secured at their lower ends to the outer ends of drag links 210 and 212. The flexible hose connections 219 between the vacuum rods 220 and the cross rod 218 are pneumatically sealed, and the cross rod, in turn, is connected by a flexible vacuum tube 274 (see Figure 4) to a vacuum relief valve 276. A second flexible vacuum tube 278 connects the relief valve 276 to a vacuum pump 280 driven by a motor 282. The vacuum pump 280 is adapted to intermittently exhaust the atmosphere from the interior of vacuum rods according to a predetermined cycle, as will be set forth more fully hereinbelow.

A main feed bar 114 (see Figures 2, 8, 31, 32, 33, and 34) is carried in a recess or channel 282 adjacent and parallel to the lower edge of the inclined workfeed table 86. This main feed bar 114 is adapted to slide freely within the recess 282 in the workfeed table, and is pivotally connected by means of a downwardly projecting arm 284 to the upper end of the main feed bar connecting rod 118. As aforesaid, the lower end of the main feed bar connecting rod is pivotally connected to counter-weighted crank disc 116, wherein rotation of the crank disc causes the main feed bar 114 to reciprocate laterally in the table top recess 282.

A series of workstrip contacting fingers 286 (see Figures 8 and 34) are pivotally connected to the main feed bar 114 and are spring-urged upwardly about their pivot pins 288 by means of coil springs 290 fitted in suitable recesses in the undersurfaces of the right sides of the fingers. With the right sides of the fingers spring-urged upwardly, their tips 292 extend above the surface of the work table an amount sufficient to engage the back or trailing edge of one thickness of workstrip. The top sides of the portions of the fingers extending above the surface of the workfeed table are beveled at 293 (see Figure 8) so that contact of the lower edge of a workstrip with these beveled surfaces will cause the fingers to be depressed flush with the surface of the work table when the workstrip is fed from the crib.

An auxiliary feed bar 295 is contained within channel 283 to the right of the main feed bar 114, as seen in Figure 31. The underside of the left outboard end of the auxiliary feed bar is provided with a rack 297 having teeth opposed to the teeth of a rack 299 parallel to and vertically spaced below rack 297. The main feed bar 114 is secured to a slide 301, the left outboard end of which rotatably carries a cluster gear pinion comprising a large diameter pinion 303 adapted to ride in rack 299, and a small diameter pinion 305 adapted to engage rack 297. The slide 301 is rigidly secured to the main feed bar 114 by means of a block 307 machined to fit in a crosswise channel in the top surface of the slide, and a dove-tailed key 309 riveted to the underside of the main feed bar 114 and secured to the block 307 by means of a clamping block 311 and a screw 313. The dovetailed key 309, clamping block 311, and screw 313 are provided to enable quick removal of the main feed bar without requiring disassembly of the workfeed table. By removing screw 313, clamping block 311 may be freely removed to the left, whereinafter the main feed bar 114 and dovetailed key 309 may also be slid laterally to the left clear of the workfeed table 86.

The lower rack 299 is rigidly secured to the underside of the workfeed table 86, so that movement of the slide 301 will cause the large diameter pinion 303 to run in meshed engagement along rack 299. The small diameter pinion 305 engages the teeth of rack 297 to impart acceleration to the rack 297 in excess of the acceleration of the slide 301 and main feed bar 114. Rack 297, therefore, accelerates the auxiliary feed bar 295 at a greater rate than that of the main feed bar 114, and, accordingly, the auxiliary feed bar 295 and the main feed bar 114 are spaced a predetermined distance apart in the channels 282 and 283 which extend parallel across the workfeed table from left to right. The auxiliary feed bar 295 is also provided with like fingers 286' such as provided on main feed bar 114, and it is the extreme left finger on the auxiliary feed bar which imparts the initial movement to the workstrip longitudinally across the workfeed onto the double die 88, as will be set forth more fully hereinafter.

Figure 34:
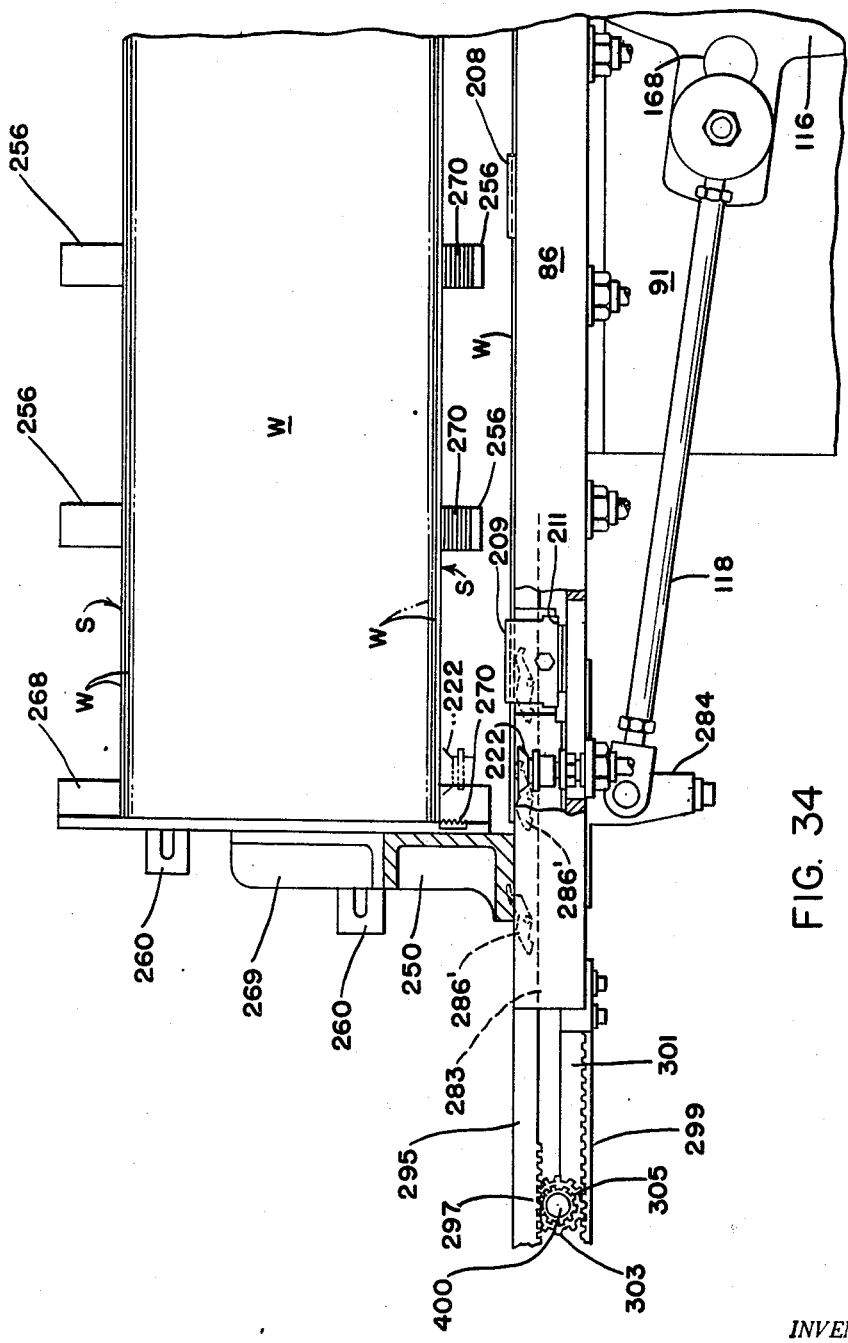
Figure 34 is a fragmentary elevational view partly in section and similar to Figure 8, but with parts 180° displaced.

A hold down 315 is secured by pivots 321 at the rear of the top surface of the workfeed table 86 to hold the work strip in contact with fingers 286' and 286 of the auxiliary and main feed bars 295 and 114 within the channels 282 and 283. A latch means 317 is also pivotally secured to the top surface of the workfeed table on the side of the table remote from the die space area 124 (see Figures 5 and 6) to maintain the hold down 315 in contact with the workfeed table 86. Magnets 319 are embedded in the surface of the workfeed table 86 to prevent a workstrip from sliding across or overriding the surface of the workfeed table ahead of the movement of the cross feed claws 208 and 209. As the workstrip is forced between the fingers 286 and the hold down plate 315, the hold down plate serves to reinforce the workstrip whereby all fingers are depressed within the channels 282 and 283. However, the workstrip contacts the fingers while the workfeed bars 114 and 295 are moving from right to left as seen in Figures 34 and 8, and therefore the auxiliary feed bar finger 286' (if a plurality of fingers are used) slips up from under the left or trailing end of the workstrip for engagement therewith during the forward stroke of the auxiliary feed bar. In case of a jam, hold down plate 315 can be swung clear to remove the faulty strip or double strip therefrom.

Press die space

Figure 11:
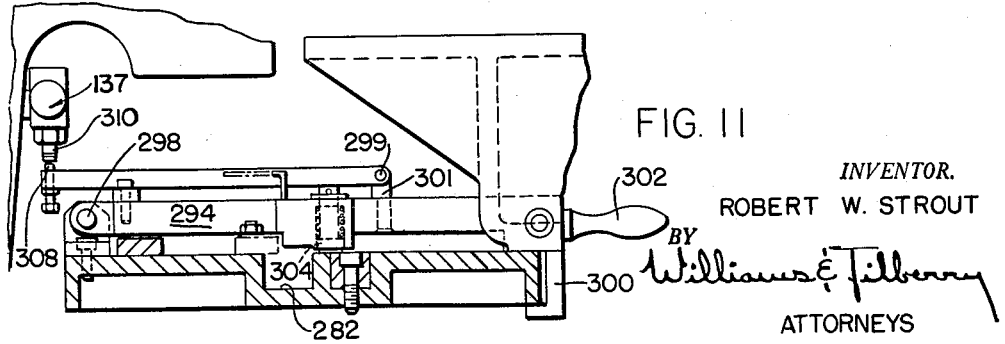
Figure 11 is a side elevation of a double feed detector means, taken on the line 11—11 of Figure 17, stationed immediately to the left of the press double die and adapted to stop the press before a double thickness of workstrip material reaches the workpiece blanking or punching area of the die.
Figure 17:
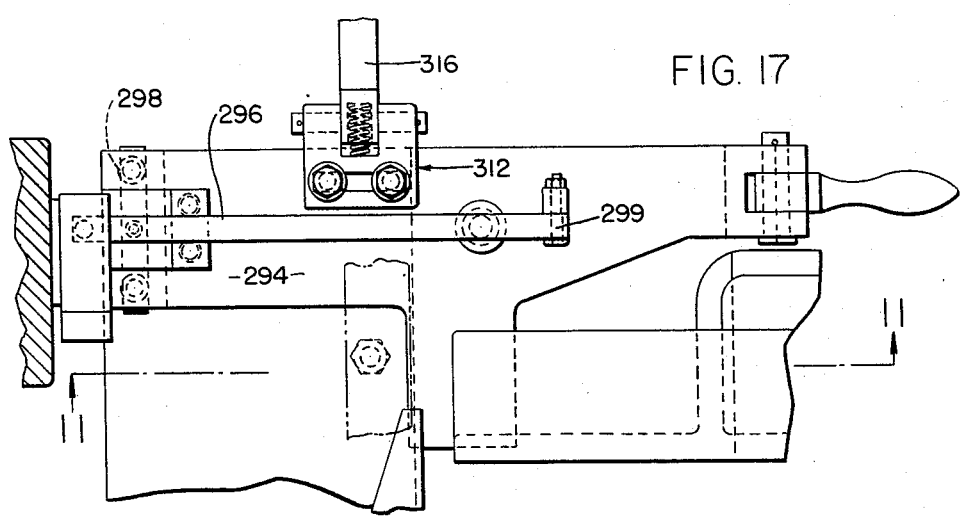
Figure 17 is a top plan view of the double detector means shown in Figure 11.

As a workstrip moves laterally from left to right across the surface of the workfeed table, as will be described in more detail hereafter, the forward or leading edge of the workstrip passes beneath the double thickness detector plate 294 (see Figures 11 and 17). The double thickness detector plate 294 is located on the right edge of the workfeed table 86 adjacent the press die space, and pivotally secured at its lower end to the surface of the workfeed table by means of hinge 298. The plate is provided at its upper end with a pivoted latch 300, and a latch handle 302; and lever arm 296 is pivoted by pin 299 to a post 301 secured to the top surface of plate 294. A spring-loaded feeler 304 passes through plate 294 and is in contact with the underside of the lever arm 296 to extend downwardly toward the surface of the workfeed table, whereby only one thickness of workstrip material is permitted to pass therebeneath. However, should a double thickness of workstrip material engage the lower end of the feeler 304, it will be forced upwardly, causing lever arm 296 to pivot about pin 299. Upward pivotal movement of the lever 296 brings lower contact 308 of the lever arm into contact with the upper contact 310 of the micro switch 137 to stop the press until the misfeed of the double thickness of material is removed from beneath the feeler. Micro switch 137 serves to arrest any double feed which might pass undetected beneath micro switch double feed detector 136 secured to the crib 90.

A workstrip holding spring bracket 312 (see Figures 17 and 21) is bolted to the right edge of the double thickness detector plate 294 and comprises a mounting block 314 and an L-shaped bracket 316 pivotally secured to the base of the mount-block and urged by a coil spring 318 clockwise about the pivot pin 320. The horizontal leg of the L-shaped bracket 316 is in the nature of a leaf spring 322 formed to exert downward pressure against a workstrip as it passes from the workfeed table 86 to the top surface of the double die 88, thereby holding the workstrip in contact with the die while the workpieces are being punched therefrom. The leaf spring 322 also serves to prevent the workstrip from overriding the double die 88 due to the impetus received from the fingers 286 and 286' of the feed bars 114 and 295. To this end, magnets may be suitably imbedded in the double die cover plate 89 (see Figure 19) to assist in preventing the workstrips from overriding.

Workpiece removal apparatus

After the punch 85 makes contact with a workstrip to punch out a workpiece, the workpiece tends to stick in the punch and is carried upwardly with the punch on its return stroke. Accordingly, it is necessary to forcibly eject the workpiece from the punch. To this end, a pair of cam blocks 324 and 326 (see Figure 14) are secured to frame members 56 and 58, respectively, and are provided with beveled cam faces 328 and 330. A pair of bell cranks 332 and 334 are pivotally secured to the opposite ends of a cross bar 336, which is fastened to the top surface of the slide 80. The upper arms 338 and 340 of each pair of bell cranks 332 and 334 are in contact with the inclined or beveled cam surfaces 328 and 330 by means of cam follower rollers 342 and 344. The lower or substantially horizontally projecting arms 346 and 348 extend inwardly through openings provided on opposite sides of the slide 80 and are connected therein to opposite sides of a blankholder ejector ring, (not shown) which is slidably fitted within the filler piece 84 to pass through and below the punch 85. The ejector ring is normally held in a retracted position within the filler piece 84 so that the edge of the punch 85 will be free from interference by the ejector ring. Any suitable spring means may be employed to hold the ejector ring in this retracted position.

As previously set forth, workpiece kickout means are provided to accelerate the removal of workpieces from the die space area between each workstroke of the press punch. The workpiece kickout means comprises: a pair of lugs 350 and 352 (see Figures 13 and 14) projecting upwardly from opposite side members 56 and 58, respectively, to pivotally journal therein a cross bar 354, which carries at its center or mid-point a downwardly extending arm 356. Secured to the lower end of the downwardly extending arm 356 are a pair of L-shaped or inwardly curved kickout arms 126 and 127, having resilient workpiece contacting pads 358 adapted to intercept the edge portion of a workpiece after it has been ejected from the punch 85. The pads 358 rapidly accelerate the workpiece rearwardly so as to be clear of the punch and die during the next subsequent stroke of the press. In order to synchronize the movement of the kickout arms 126 and 127 with the motion of the punch, a cam plate 360 is fastened to the upper surface of the slide 80, having an S-shaped cam groove 362 formed therein to urge the downwardly projecting arm 356 outwardly clear of the punch during the downstroke of the punch and to pull the arms 126 and 127 inwardly during the upstroke of the punch.

Scrap ejector rolls

As the workpiece is intermittently fed across the surface of the die 88, the leading edge of the workstrip passes laterally to the right between the aforesaid pair of ejector rolls 120 and 122 (see Figure 1). The upper roll 122 is rotating in a counter-clockwise direction, and the lower roll 120 is rotating in a clockwise direction. However, while the workstrip is being intermittently fed laterally across the surface of the double die 88, the scrap ejector rolls are in the open position, i.e., they are vertically spaced apart to allow the workstrip to pass freely therebetween. When the last workpiece has been punched from the workstrip, and the punch 85 is clear of the workstrip, on its upward stroke, the scrap ejector rolls 120 and 122 close on the workstrip scrap to accelerate movement of the scrap laterally to the right so as to clear the die space for the next following workpiece.

Figure 16:
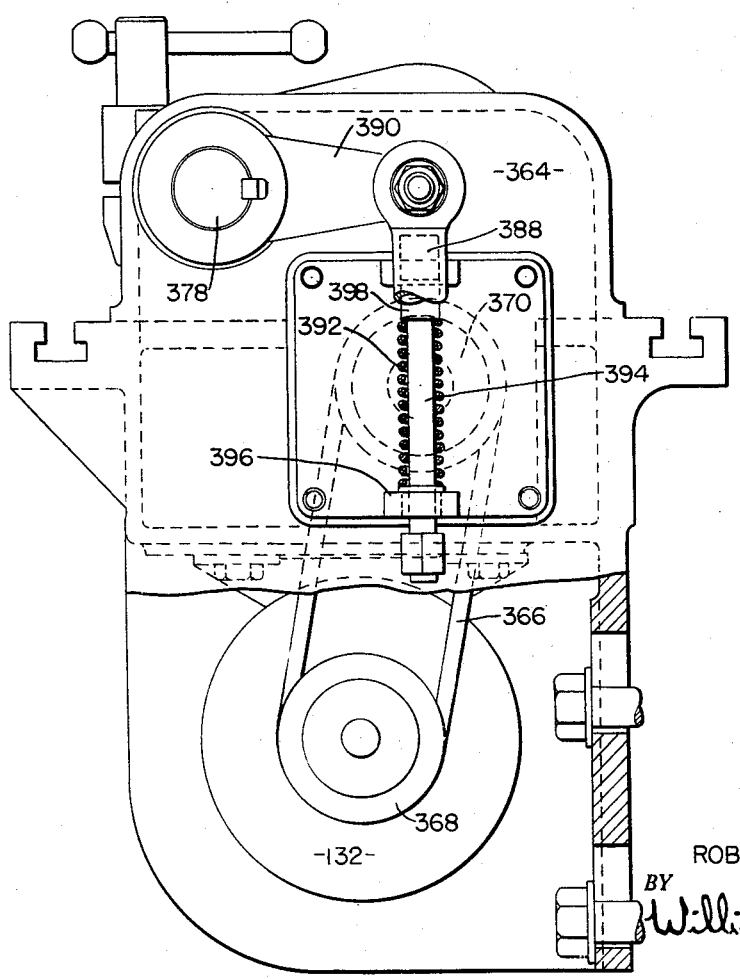
Figure 16 is an elevational view of the scrap ejector means shown in Figure 15, and taken on line 16—16 of Fig. 15.

The mechanism for actuating the scrap ejector rolls comprises: a scrap ejector housing 364 adapted to journal serrated ejector rolls 120 and 122 at the proper elevation and inclination to receive scrap from the right side of the die 88 (see Figure 3). A motor 132 (see also Figure 16) is mounted on the scrap ejector housing 364 and connected to the lower ejector roll 120 by a V-belt 366 and pulleys 368 and 370 to positively drive the lower ejector roll. The left or upper ends of the scrap ejector rolls, as seen in Figures 3 and 15, are provided with mating spur gears 372 and 374, whereby the upper ejector roll 122 is driven by the lower ejector roll 120 in an opposite rotational direction. The lower ejector roll 120 is journaled directly in the ejector housing 364, and the upper ejector roll is journaled in a yoke 376 (see Figure 18), which is adjustably secured to a cross shaft 378 rotatably mounted in the ejector housing parallel to the ejector rolls. The yoke 376 may be angularly adjusted about the axis of the cross shaft 378 and locked into any adjusted angular position by means of clamping jaws 380 and 382 integral with the yoke 376 (see also Figure 22) and clamping bolt and lever 384 and 386. The purpose of this adjustable clamping means is to provide a variable space between the ejector rolls in the open position depending on the thickness of the workstrip being processed in the press.

In order to close the upper roll 122 with the lower roll 120, the upper roll is pivoted in yoke 376 about the axis of cross shaft 378 downwardly by means of a draw rod 388 (see Figures 15 and 16) which is pivotally secured to the free end of an arm 390 keyed to the rear end of the cross shaft 378. The lower end of the draw rod 388 (see Figure 3) is pivotally secured to the free end of rock arm 246, which is rocked about the axis of shaft 242 by means already described. The ejector rolls are normally spaced apart and mounted in this position by means of a spring return coil spring 392 which is placed about a retaining rod 394 in compression between a frame boss at 396 and a retaining rod collar 398 adjacent the underside of the arm 390. When the rock arm 246 (see Figure 3) is rocked downwardly, the draw rod 388 and retaining rod 398 are also pulled downwardly to compress the spring 392 and pivot the upper ejector roll 122 downwardly into contact with scrap passing between the upper and lower ejector rolls. Upward movement of rock arm 246 releases the compressive force on coil spring 392, whereinafter the coil spring returns the upper roll to the open position.

*Operation of the strip feed press*

The various separate mechanisms of the strip feed press having been described in detail, integration and cooperation between these various mechanisms will now be more fully set forth.

In view of the direct drive between the crankshaft 64 and the feed box gear assembly main drive shaft 98 by chain 96 and sprockets 94 and 97, all of the press embodiments actuated by the press feed box gear assembly 91 will operate in timed relationship with each other whenever the crankshaft 64 is rotated by the press motor 72 and flywheel 70.

To begin operation of the press, a stack of workstrips are placed in the workstrip crib 90 and the main motor 72 is energized to start the crankshaft 64 rotating. In addition to energizing the main press motor 72, the vacuum pump 280 and motor 282, and scrap ejector motor 132 are also energized to run continuously. A vacuum is created in the portion of the vacuum line 278 between the vacuum pump 280 and the vacuum relief valve 276 (see Figure 4). When the transmission main gear 164 revolves rockshaft 194 upwardly, drag links 210 and 212, and links 214 and 216 cooperate to urge vacuum cups 222, carried on tubular vacuum rods 220, into engagement with the lower surface of the bottom strip W of the stack of workstrips S (see Figure 1). The vacuum cups 222 make contact with the lower workstrip, and the cam 226 on the end of camshaft 166 rotates to actuate cam follower 236 of bell crank 230 (see Figure 24), wherein the spring 275 of the vacuum relief valve 276 is compressed and the valve is closed to create a vacuum within the vacuum cups 222.

When the vacuum cups 222 have been exhausted of air, the angular rotation of rockshaft 194 is reversed to draw the vacuum cups and related linkage downwardly, and to remove therewith the bottom workstrip W from the stack of workstrips S (see Figure 33). The bottom workstrip is so removable because it is flexible enough to buckle or flex downwardly slightly to slip by the inwardly projecting resilient fingers 270 adapted to support the stack of workstrips above the surface of the worktable, but to yield to a predetermined downward force. Prior to depositing the workstrip on the surface of the worktable, the cam 226 releases the bell crank 230 from pressure contact with valve ring 240 and spring 275, thereby allowing the vacuum relief valve to open and release the vacuum cups 222 from the workstrip. The vacuum cups 222 then come to rest slightly beneath the surface of the workfeed table (see Figure 24).

At the same time, the main drive shaft 98 (see Figure 23) is rotating cross shaft 168 and the counter-balanced crank disc 116 secured thereon to its upper end. Connecting rod 118, secured at its lower end to the crank disc 116 and at its upper end to an arm 284 (Figures 8, 33 and 34) projecting downwardly from the slide 301, causes the workfeed bars 114 and 295 to laterally oscillate in their channels in the surface of the workfeed table 86 adjacent its lower edge. After the workstrip has been deposited on the surface of the workfeed table, rock arm 190 (see Figure 28) is rotated by the main gear 164 to cause drag links 198 and 200 to pivot downwardly. Cross rods 204 and 206, (see Figures 24 and 30) having workstrip engaging claws 208 and 209 at their upper ends are drawn down with the drag links 198 and 200. The workstrip is moved across the workfeed table beneath hold down 315 and into contact with a stop bar 215 (see Figures 5 and 6) to position the workstrip on top of the fingers 286 and 286' of the workfeed bars 114 and 295. After the cross rods 204 and 206 position a workstrip over the cross feed bars, the angular rotation of the rockshaft 190 is reversed by the main gear 164, and the draw down or work engaging claws 208 and 209 are returned to their starting position adjacent the upper edge of the workfeed table.

Figure 10:
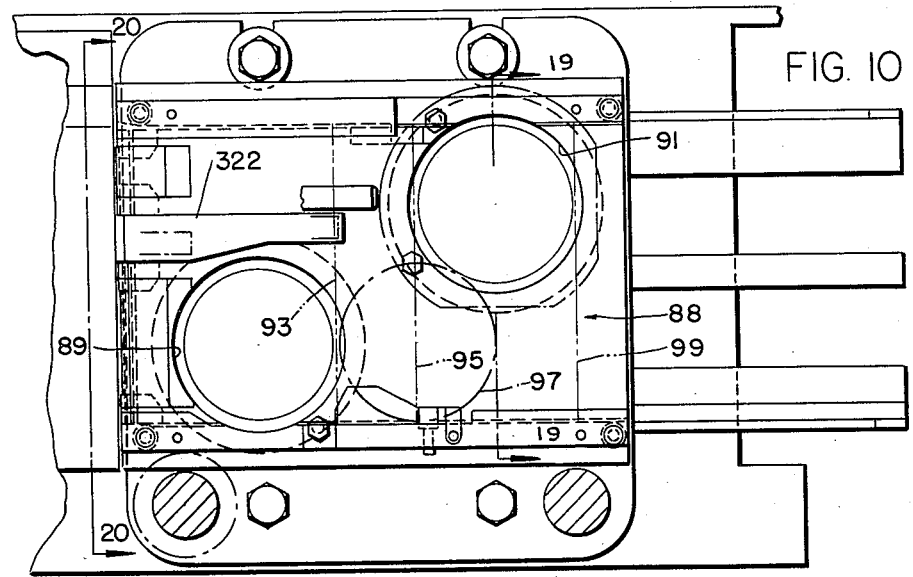
Figure 10 is a top plan view of the press die showing the location of incoming and outgoing workstrips relative thereto.

Referring now to Figure 10, it will be seen that the double die 88 comprises diagonally arrayed dies 89 and 91. The position of the trailing edge of the outgoing workstrip, just before the last workpiece has been stamped therefrom, is indicated at line 93, and the position of the leading edge of the incoming workstrip at the same instant is indicated at line 95. It is apparent, therefore, that an overlap exists between the incoming and outgoing workstrips at the moment that the first workpiece from the incoming workstrip and the last workpiece from the outgoing workstrip are simultaneously stamped therefrom. The condition of overlap between the incoming and outgoing workstrips is assisted by deflector means 401 which urges the leading edge of the incoming workstrip upwardly onto the top surface of the outgoing workstrip. The deflector means 401 (see Figures 20 and 21) comprises spring loaded inclined plates 402 and 404 which are pivotally mounted on a rod 406. The rod 406 is secured to the left side of double die plate 89 normal to the path of travel of the workstrips.

Before the next downward workstroke of the press, the outgoing workstrip is engaged by the ejector rolls 120 and 122 and thereby removed from the die space area. At the same time, the leading edge of the incoming workstrip is advanced to the position indicated at line 99. With this position of the workstrip, the hole remaining in the workstrip after the first workpiece has been stamped therefrom is indicated at 97, and it will be seen that the incoming workstrip is now positioned over dies 89 and 91 so that two workpieces will be stamped from the workstrip during the next workstroke of the press. Thus, for every workstroke of the press, two workpieces are stamped from the workstrips passing across the double die 88, there being no missed stroke between the outgoing workstrip and the incoming workstrip. This is accomplished by virtue of the overlap between the respective incoming and outgoing workstrips, whereby the first workpiece from the incoming workstrip and the last piece from the outgoing workstrip are stamped simultaneously.

The overlap condition between incoming and outgoing workstrips, so as to avoid nonproductive workstrokes, is accomplished by cooperative action of the auxiliary feed bar 295 and the main feed bar 114 in the following manner. Basically, both feed bars are reciprocated by the slide 301 (see Figures 8, 31, and 34), the pin 400, which rotatably carries the cluster gear pinions 303 and 305, being secured to the left outboard end of the slide 301. Pin 400 is reciprocated at the same rate of acceleration and velocity as that of the main feed bar, and the pinion 303 is made to rotate by running on stationary rack 299. Cluster gear pinion 305 is likewise rotated to drive rack 297 which is integral with the auxiliary feed bar. Accordingly, the auxiliary feed bar reciprocates at an average velocity in excess of the average velocity of the main feed bar.

When the workstrip is positioned over the feed bars by the cross rods 204 and 206, and the claws 208 and 209, the auxiliary feed bar finger 286' on the auxiliary feed bar engages the trailing edge of a workstrip and advances the leading edge of the workstrip to the position indicated at line 95 in Figure 10. Thereafter, the fingers 286 on the main feed bar take over and consecutively engage the trailing edge of the workstrip to intermittently advance the workstrip across the face of the double die 88. When the trailing edge of the workstrip reaches the position indicated by line 93, the auxiliary feed bar advances the subsequent workstrip into the overlapping position indicated by lines 93 and 95. In the preferred embodiment of the invention, the average velocity of the auxiliary feed bar is substantially 1.7 times that of the main feed bar, thereby enabling the leading edge of a following workstrip to overtake and overlap the trailing edge of a prior workstrip, which at the time is being intermittently advanced by the slower main feed bar. One or more fingers 286' may be employed on the auxiliary feed bar depending on the length of the workstrip being fed into the press, and one to two workfingers are usually sufficient for most stamping operations.

The rotation of the crankshaft is timed to punch out workstrips during the periods between intermittent feeding of a workstrip by the workfeed bars until all workpieces have been stamped therefrom. Thereafter, as aforesaid, the workstrip is engaged by the scrap ejector rolls 120 and 122, for removal from the press. The camshaft 166 of the feed gear box assembly carries on its right or inboard end the cam 228 (see Figures 1, 25 and 28) which is adapted to contact a rockarm type cam follower 244 to oscillate rockshaft 242. Finally, rock arm 246 on rockshaft 242 draws the upper scrap ejector roll 122 (see also Figure 3) downwardly in time to engage the workstrip just after the last workpiece has been stamped therefrom, and after the punch 85 is clear of the workstrip.

As the punch 84 withdraws from the lower die, bell crank arms 338 and 340, of bell cranks 332 and 334, respectively, are forced inwardly toward the vertical center line 341 of the press frame 52, and the bell crank arms 346 and 348 are rotated downwardly to force the punch workpiece ejector ring (not shown) downwardly, thereby removing the workpiece from the punch. When the workpiece drops from beneath the punch, the upward movement of the slide 80 causes cam 360 to draw kickout arms 126 and 127 inwardly. The resilient forward edges 358 of the kickout arms strike the edge of the workpiece to greatly accelerate the movement of the workpiece toward the rear of the press and clear of the die space area 124. The workpiece is then carried down a motorized conveyor belt (not shown) into a double curler mechanism 120 where the edges are further processed and then automatically stacked in the racks 130.

The sequence of operations described hereinabove are all in timed relationship, one with the other, to operate continuously and automatically. As soon as one workstrip has cleared the minimum required space on the surface of the workfeed table, extracting means 110 operate to deposit a subsequent workstrip on the surface of the workfeed table. Thereafter, each workstrip is fed into the press sequentially in like manner to the preceding workstrip.

It is to be understood that while only one embodiment of the invention is shown herein, this embodiment is by way of example only and is not to be construed in a limiting sense. Other arrangements and modifications will occur to those skilled in the art and may be resorted to without departing from the scope of the invention.

I claim:
1. In a strip feed press, the improvement in workstrip feed means comprising: a workstrip feed table inclined from front to back and secured to one side of said press, a main feed bar slidably recessed in the top surface of the workfeed table for lateral reciprocal movement; an auxiliary feed bar slidably recessed in the top surface of the workfeed table for lateral reciprocal movement; depressible workstrip engaging fingers secured to each of said feed bars and spring urged upwardly to consecutively engage the trailing edge of workstrips consecutively superposed over said feed bars; a pair of pinions concentrically aligned and rigidly secured together; a bracket secured to said main feed bar to rotatably journal said pinions thereon; a rack rigidly secured to said table to mesh with one of the said pinions; a rack rigidly secured to said auxiliary feed bar to mesh with the other of said pinions; and a feed gear box assembly positioned beneath said table adapted to reciprocate said main feed bar at a predetermined average velocity, whereby said auxiliary feed bar is reciprocated at a predetermined average velocity greater than that of said main feed bar.

2. In a strip feed press having a workstrip feed table inclined from front to rear and secured to one side thereof, the improvement in workstrip feed means adapted to advance an incoming workstrip laterally across said workstrip feed table onto a press double die in overlapping relationship with an outgoing workstrip, thereby to enable a press double punch to simultaneously stamp a first workpiece from said incoming workstrip and a last workpiece from said outgoing workstrip, and thereafter to consecutively stamp intermediate workpieces from said incoming workstrip, said improvement in workstrip feed means comprising: a main feed bar slidably recessed in the top surface of the said workfeed table for lateral reciprocal movement; an auxiliary feed bar slidably recessed in the top surface of said workfeed table for lateral recirpocal movement, said auxiliary feed bar being co-planar with said main feed bar, and with the outboard end of said auxiliary feed bar extending laterally beyond the outboard end of said main feed bar; depressible workstrip engaging fingers secured to each of said feed bars and laterally spaced apart, said fingers being resiliently urged upwardly to consecutively engage the trailing edges of workstrips consecutively superposed over said feed bars; a pair of pinions concentrically aligned and rigidly secured together; a bracket secured to said main feed bar to rotatably journal said pinions thereon; a rack rigidly secured to said table to mesh with one of the said pinions; a rack rigidly secured to said auxiliary feed bar to mesh with the other of said pinions, and a feed gear box assembly positioned beneath said table to reciprocate said main feed bar at a predetermined average velocity, whereby said auxiliary feed bar is reciprocated at a predetermined average velocity greater than that of said main feed bar.

3. The strip feed press set forth in claim 2, including a hold down plate superposed adjacent said feed bars and spaced above the said workfeed table an amount sufficient to permit a workstrip to freely pass therebeneath and to depress the main feed bar workstrip engaging fingers, whereby an auxiliary feed bar workstrip engaging finger remains upstanding to engage the trailing edge of a workstrip for lateral movement toward said press die.

4. The strip feed press set forth in claim 2, wherein said main feed bar is recessed in a channel in the top surface of the workstrip feed table parallel and adjacent to the table lower edge; and said auxiliary feed bar is recessed in a channel in the top surface of the workstrip feed table parallel to said main feed bar channel, whereby the auxiliary feed bar workstrip engaging fingers intermittently advance a workstrip toward the press die at a predetermined velocity until the workstrip is intercepted by the main feed bar workstrip engaging fingers, whereinafter the workstrip is intermittently advanced across the press die at a lesser velocity, the parallel channels permitting differential velocities between the feed bars without interference one with the other.

References Cited in the file of this patent

UNITED STATES PATENTS

| | | |
|---|---|---|
| 1,946,874 | Nicholas | Feb. 13, 1934 |
| 2,200,886 | Kuhn | May 14, 1940 |
| 2,260,182 | Knutsen et al. | Oct. 21, 1941 |
| 2,305,191 | Pearson et al. | Dec. 15, 1942 |
| 2,360,337 | Gookin | Oct. 17, 1944 |
| 2,404,228 | Hamlin | July 16, 1946 |
| 2,521,461 | Jordan | Sept. 5, 1950 |
| 2,577,084 | Laxo | Dec. 4, 1951 |
| 2,657,049 | Baker | Oct. 27, 1953 |
| 2,371,177 | Luthi | Mar. 5, 1954 |